(12) United States Patent
Pritmani et al.

(10) Patent No.: US 12,554,484 B2
(45) Date of Patent: Feb. 17, 2026

(54) SYSTEMS AND METHODS PROVIDING CENTRALIZED COMMUNICATION ACROSS FEATURE PROGRAMMING WORKFLOWS

(71) Applicant: Citibank, N.A., New York, NY (US)

(72) Inventors: Rajni Pritmani, New York, NY (US); Laura McNeil, New York, NY (US); Muthukumar Arunachalam, New York, NY (US); Srikanth Bezawada, New York, NY (US); Nancy Griffin, New York, NY (US); Nilasundar Jena, New York, NY (US); William Cameron, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/199,299

(22) Filed: May 5, 2025

(65) Prior Publication Data
US 2025/0265077 A1 Aug. 21, 2025

Related U.S. Application Data

(63) Continuation-in-part of application No. 18/818,113, filed on Aug. 28, 2024, which is a continuation of application No. 18/474,162, filed on Sep. 25, 2023, now Pat. No. 12,112,160, which is a continuation of application No. 18/345,417, filed on Jun. 30, 2023, now Pat. No. 11,803,369.

(51) Int. Cl.
*G06F 8/70* (2018.01)

(52) U.S. Cl.
CPC ................ *G06F 8/70* (2013.01)

(58) Field of Classification Search
CPC .......................................... G06F 8/70
USPC ............................................ 717/120
See application file for complete search history.

(56) References Cited

U.S. PATENT DOCUMENTS

| | | | |
|---|---|---|---|
| 7,301,448 B1 * | 11/2007 | Usery | H04L 43/0817 340/520 |
| 2017/0316509 A1 * | 11/2017 | Hiramatsu | G06Q 40/08 |
| 2020/0133711 A1 * | 4/2020 | Webster | G06F 8/30 |
| 2021/0397423 A1 * | 12/2021 | Krishnamoorthy | G06F 8/71 |

* cited by examiner

*Primary Examiner* — Hanh Thi-Minh Bui
(74) *Attorney, Agent, or Firm* — Foley & Lardner LLP

(57) ABSTRACT

Systems and methods that provide status indications in response to detection of one or more duplicate operations between a first software programming workflow and a second software programming workflow are disclosed herein. By selectively generating status indications on display devices associated with designated users during separate software programming workflows as described, systems can be configured to accurately determine when redundant operations are to be executed across different software programming workflows and provide indications that reduce or eliminate the need for subsequent, duplicative operations to be executed when developing corresponding portions of different software programming workflows.

19 Claims, 11 Drawing Sheets

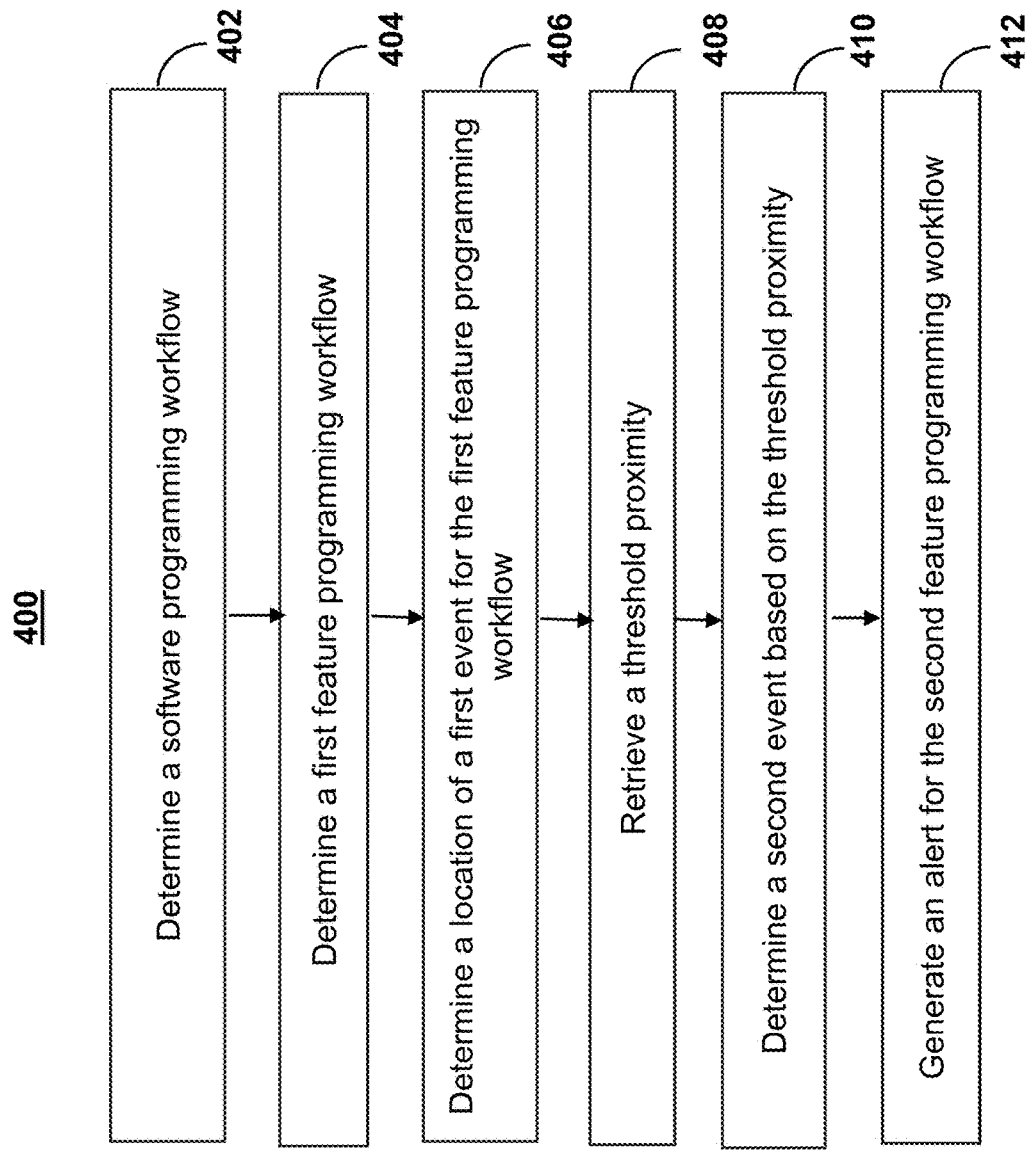

SYSTEMS AND METHODS PROVIDING CENTRALIZED COMMUNICATION ACROSS FEATURE PROGRAMMING WORKFLOWS

CROSS-REFERENCE TO RELATED APPLICATIONS

This application is a continuation in part of U.S. patent application Ser. No. 18/818,113, filed Aug. 28, 2024, which is a continuation of U.S. patent application Ser. No. 18/474,162, filed Sep. 25, 2023, which is a continuation of U.S. patent application Ser. No. 18/345,417, filed Jun. 30, 2023. The content of the foregoing applications is incorporated herein in its entirety by reference.

BACKGROUND

Software programming typically involves multiple streams of code and/or software programming teams interacting with each other to produce one or more applications, each of which may perform one or more features and/or functions. Accordingly, software programming is typically a team-based activity, in which the responsibilities for the features and source code necessary to produce a given feature (e.g., the plurality of features in a given application) are shared among team members. To facilitate this team activity, team members may submit contributions to the application using a software development lifecycle tool. This tool may include a codebase that features a full history of the project (e.g., that may mirror the codebase on every contributor's computer). The tool may also enable automatic management of different branches of the application (e.g., via providing configuration and document management, roadmaps for feature production, and/or centralized communication) as well as the merging of different contributions. The team may also utilize one or more software programming development and bug-tracking tools.

Furthermore, responsibilities of each team member are often intertwined. For example, in order to advance one feature, one user may need to wait for another user's submission (e.g., the completion of another feature), which may lead to bottlenecks. In cases of bottlenecks, software programming assignments are difficult to reassign and adding new users to assist in currently-in-progress contributions is difficult, as the new users may need to be brought up to speed on the current progress. Moreover, software programming may involve individual stylistic choices that may not be common across the team, and for which variation from the stylistic choice may create issues with the contribution.

SUMMARY

Accordingly, some systems and methods are described herein for novel uses and improvements to software development lifecycle tools. In particular, these systems and methods are designed to configure software development lifecycle tools to obtain and analyze data associated with software programming workflows, and selectively send alerts to relevant users about potential redundancies or duplications (e.g., in code or portions thereof being developed) identified during the execution of software development workflows. These systems can address inefficiencies associated with other approaches, such as systems that rely solely on text-based analysis of source code being developed, which can consume unnecessary computing and network resources and overwhelm teams with irrelevant information, especially in complex and dynamic software programming workflows.

In some examples, systems can be configured to coordinate code generation across teams by implementing version control, standardized APIs, and automated code analysis to streamline the aggregation of individual contributions into a cohesive codebase. However, these systems may not extend adequate visibility across separate workstreams, meaning that independent teams may inadvertently develop similar or even identical modules in isolation without the benefit of a unified oversight mechanism. This gap in detecting overlapping development efforts can result in unintentional code duplication, where functionally equivalent code is created separately, thereby introducing redundancies that complicate subsequent maintenance and updates.

To further improve centralized communication across feature programming workflows, systems can be configured to providing status indications in response to detection of one or more duplicate operations between a first software workflow and a second software workflow. For example, a system can be configured to obtain a first software programming workflow comprising a first set of events and a second software programming workflow comprising a second set of events. The system can determine the first set of events for the first software programming workflow and the second set of events for the second software programming workflow, and determine that a first event of the first software programming workflow corresponds to a second event of the second software programming workflow. In response to determining that the first event corresponds to the second event, the system can determine a first state of the first event and a second state of the second event. The first state indicating that the first event is completed and the second state indicating that the second event is not completed. Where the first event or the second event is associated with a state that satisfies a completion threshold (e.g., indicating that development is ahead in one workflow relative to the other), the system can cause a display device associated with a user assigned to complete the second event to generate a status indication of one or more aspects of the first event that are common to the second event. Additionally, or alternatively, where the first event or the second event do not satisfy the threshold, the system can similarly be configured to cause a display device associated with a user assigned to complete the second event to generate a status indication of one or more aspects of the first event that are common to the second event.

By virtue of the implementation of the techniques described herein, systems can reduce computing processor and memory consumption by consolidating duplicate operations across software and/or feature programming workflows and can reduce network communication by transmitting only prioritized status indications when corresponding events between workflows are detected. For example, systems can be configured to determine whether events that correspond to one another satisfy a predetermined completion threshold. Once determined, the system can cause a display device associated with a user assigned to an event (e.g., to complete a portion of code associated with one or more software programming workflows) to generate a status indication indicating common aspects of the corresponding events at devices controlled by corresponding software developers. As a result, the system can inform users who have not yet started or are trailing in progress relative to others to detect common code segments across separate software programming workflows, with such segments being directly reusable or copyable without significant editing to complete the corresponding portion of the software programming workflow. This, in turn, can reduces redundant processing cycles and network communication that would otherwise be involved in the user communicating with a centralized code repository when editing and/or debugging code when duplicating the earlier-developed code.

Various other aspects, features, and advantages of the invention will be apparent through the detailed description of the invention and the drawings attached hereto. It is also to be understood that both the foregoing general description and the following detailed description are examples and are not restrictive to the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in providing centralized communication across feature programming workflows, in accordance with one or more embodiments.

DETAILED DESCRIPTION OF THE DRAWINGS

Figure 1:
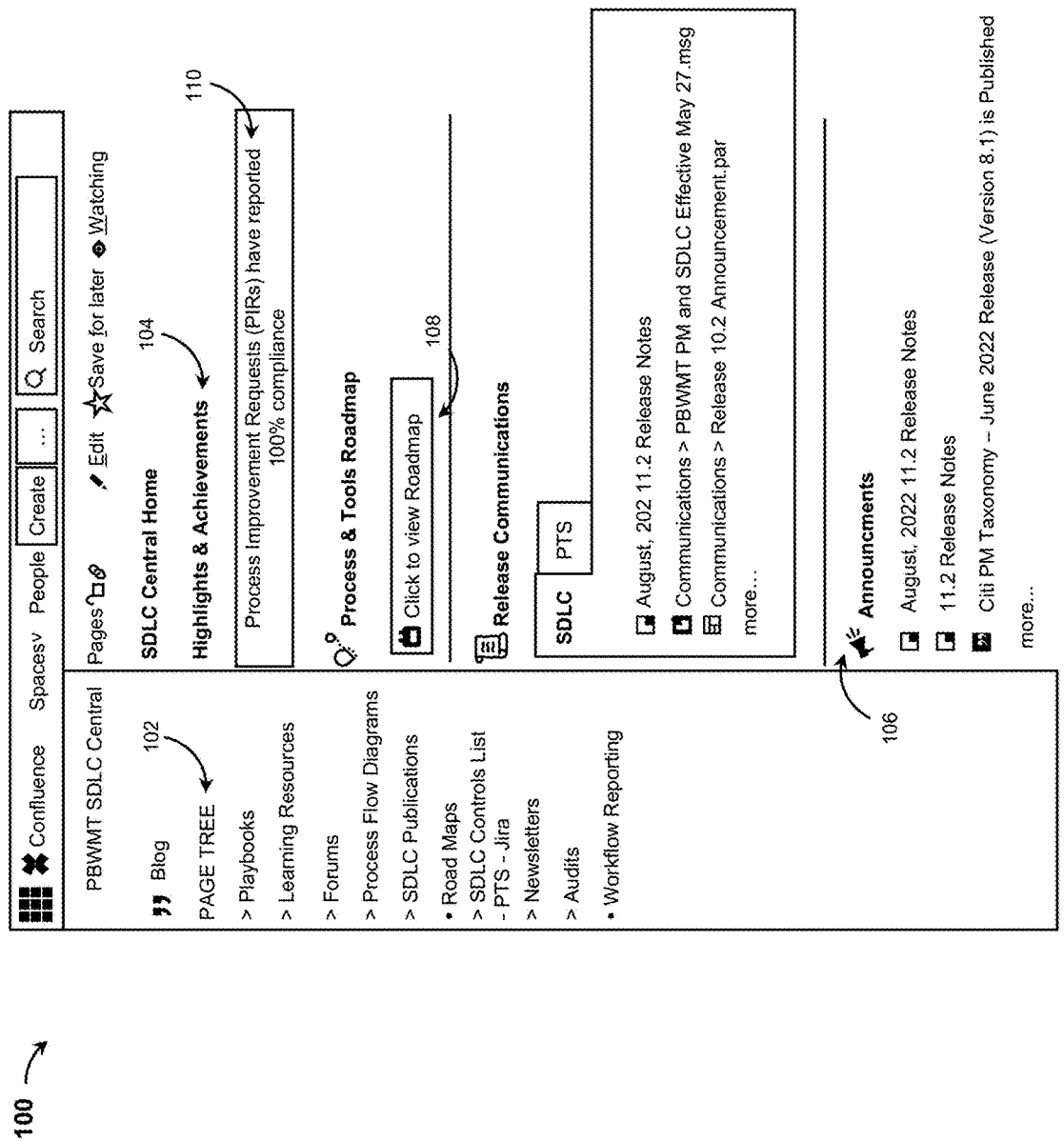
FIG. 1 shows an illustrative user interface for providing centralized communication across feature programming workflows, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Accordingly, systems and methods are described herein for novel uses and/or improvements to software development lifecycle tools. In particular, the systems and methods recite a software development lifecycle tool that minimizes the number of bottlenecks in software development by providing centralized communication across feature programming workflows. For example, due to the complexity of software development, software development for a given feature of a larger application is often siloed to users with a specific expertise in programming the relevant feature. However, because code for each feature is developed independently and/or may include timelines and/or events that are unknown to the developers of other features, detecting compliance to a development timeline for a feature to which a user is not involved is difficult. Nonetheless, given that a delay of a first feature may cause a second feature to be delayed (e.g., the second feature may have dependencies and/or may need to be conformed to the first feature), users need to coordinate to minimize bottlenecks.

One solution for overcoming this technical problem is for a software development lifecycle tool to send updates for all features to all development users. However, as the size and/or complexity of an application increases, the amount of content needed to be distributed may crowd out any content that is relevant to a given team and/or user. Furthermore, software development lifecycles are dynamic processes. As such, the deadline for a given event may constantly change as deadlines for other events and/or features may be delayed and/or finished ahead of schedule. Each of these updates may also crowd out the display and/or receipt of timely alerts, even if the alert is relevant to a given team and/or user.

In contrast to such a blunt solution, the systems and methods provide centralized communication across feature programming workflows using software development lifecycle tools that dynamically determine temporal alerts. That is, as opposed to generating all alerts related to an application, the system may generate alerts that are dynamically determined to be temporally relevant. By dynamically determining events that are temporally relevant, the system may account for changes in an application timeline that may comprise a plurality of events, in which each event of the plurality of events indicates when a respective feature of the plurality of features is available for use by the application, and in which the location of each event constantly changes.

However, simply determining events that are temporally relevant may still not be sufficient in minimizing bottlenecks. For example, teams or users may still be flooded with temporally relevant events and any alert needs to be generated with enough time to allow for the alert to be acted on. Accordingly, to determine events for which alerts will be generated, the systems and methods determine a current status of a software programming workflow (e.g., a workflow for one of the features of the application). The systems and methods may then estimate a likely time at which a feature is available for use by the application based on its current status (e.g., accounting for any delays and/or early production of a feature). The system may then select a threshold proximity for generating alerts (e.g., which may be specific to a given team or user). The system may then determine any events that are within the threshold proximity on the application timeline. Upon detecting any events, the systems and methods may generate an alert to users involved with features corresponding to the determined events. By doing so, the systems and methods may identify events (e.g., other features being available to an application) that are temporally relevant to a given feature being available for use by the application as well as filter those events based on the threshold proximity.

Accordingly, systems and methods are described herein for novel uses and/or improvements to software development lifecycle tools. In particular, systems and methods are described with respect to the configuration of software development lifecycle tools to obtain and analyze data associated with a software programming workflow, and selectively sends alerts to relevant users about delays that occur during execution of software development workflows based on the dependencies involved. And implementation of the techniques described address inefficiencies associated with other approaches, such as broadcasting updates to broad groups of developers, that can both consume unnecessary computing and network resources to generate and transmit, as well as overwhelm teams with irrelevant information, especially in complex and dynamic software programming workflows.

In some examples, systems are described that can be configured to dynamically evaluate dependencies associated with feature programming workflows involved in the generation of a software application. For example, if the completion of a portion of code (a first event) depends on another (e.g., a second event), systems can be configured to identify this relationship (referred to as a dependency) and monitor the status of code development. Instead of indiscriminately notifying all users about every delay attributable to the events involved in each feature programming workflow, systems described can be configured to determine when a delay in one feature might impact another based on these dependencies and send alerts only to those directly affected. Additionally, the systems described can account for changes in project timelines by continuously updating its understanding of dependencies and deadlines. For instance, if a completion date associated with a given event (or a given task or tasks involved in the event) shifts due to unforeseen delays or early completion, the system can determine this change and determine its impact on dependent events. The system can then determine and dynamically generate alerts for software developers involved in the affected events. By doing so, systems can be configured to selectively generate alerts that are contextually relevant as project dynamics evolve, not only reducing unnecessary generation and communication of alerts but also minimizing bottlenecks by allowing teams to focus on addressing critical dependencies.

In some aspects, systems and methods are described herein for providing centralized communication across feature programming workflows using software development lifecycle tools that dynamically determine temporal alerts. For example, the system may determine a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application. The system may determine a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application. The system may determine a first location, in the application timeline, of the first event based on a current status of the software programming workflow. The system may retrieve a threshold proximity for generating alerts for a second feature programming workflow. The system may determine a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application. The system may generate for display, in a user interface of a software development lifecycle tool for the second feature, an alert based on the first location.

By virtue of implementing these techniques to further improve centralized communication across feature programming workflows, multiple technical benefits can be achieved. First, computing resources such as processing power and memory can be conserved by optimizing the system to selectively process only those events or dependencies that are relevant to determining the global programming status. This reduces what could otherwise be unnecessary processor and memory usage, allowing for more efficient resource allocation. Second, networking resources can be conserved by minimizing the frequency and size of communications over the network when generating user interfaces that alert various users of delays across a software programming workflow. For example, the system can aggregate status updates to reduce data transfer requirements, thereby lowering bandwidth consumption while maintaining effective centralized communication across workflows. Additionally, by analyzing dependencies between feature programming workflows periodically or in real-time, the system can more accurately identify how changes in one workflow affect others, enabling it to generate targeted alerts that notify users of critical impacts on the software programming workflow as they occur.

FIG. 1 shows an illustrative user interface for providing centralized communication across feature programming workflows, in accordance with one or more embodiments. For example, the system and methods described herein may generate for display, on a local display device, a user interface for a software development lifecycle tool. As referred to herein, a "user interface" may comprise a human-computer interaction and communication in a device and may include display screens, keyboards, a mouse, and the appearance of a desktop. For example, a user interface may comprise a way a user interacts with an application or a website. User interface 100 may comprise one or more alerts. For example, an alert may comprise any content.

As referred to herein, "content" should be understood to mean an electronically consumable user asset, such as internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia, and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user. In some embodiments, the content may comprise configuration and document management materials, roadmaps for feature production, and/or centralized communication alerts. For example, user interface 100 may represent a dashboard for a software development lifecycle tool to send code updates for all features to all development users.

User interface 100 may comprise a user interface for a software development lifecycle tool. In some embodiments, a software development lifecycle tool may include a software development lifecycle tool that integrates multiple other software development lifecycle tools. Through user interface 100, the software development lifecycle tool may receive a first user request to access a first code string alert (e.g., alert 104) and/or perform one or more operations, such as selecting code strings for feature programming workflows and/or applying parameters to the feature programming workflows (e.g., setting independent variables, uploading code strings, and/or selecting output settings). The system may output an alert that includes a plurality of information types, such as textual information, graphical information, and/or other information. In some embodiments, user interface 100 may comprise an easily understandable dashboard to provide a description of an alert.

Moreover, an alert may be specialized and/or communicated to a subset of users for which the alert is particularly relevant. For example, a deadline for a given event may constantly change as deadlines for other events and/or features may be delayed and/or finished ahead of schedule. Each of these updates may also crowd out the display and/or receipt of timely alerts, even if the alert is relevant to a given team and/or user. Additionally, each event (e.g., corresponding to progress of the software programming workflow) of the plurality of events indicates when a respective feature of the plurality of features is available for use by the application, and in which the location of each event constantly changes.

User interface 100 may provide centralized communication across feature programming workflows using software development lifecycle tools that dynamically determine temporal alerts. That is, as opposed to generating all alerts related to an application, the system may generate alerts that are dynamically determined to be temporally relevant. By dynamically determining events that are temporally relevant, user interface 100 may account for changes in an application timeline that may comprise a plurality of events, in which each event of the plurality of events indicates when a respective feature of the plurality of features is available for use by the application, and in which the location of each event constantly changes.

However, simply determining events that are temporally relevant may still not be sufficient in minimizing bottlenecks. For example, teams or users may still be flooded with temporally relevant events and any alert needs to be generated with enough time to allow for the alert to be acted on. Accordingly, to determine events for which alerts will be generated, user interface 100 may determine a current status of a software programming workflow (e.g., a workflow for one of the features of the application). User interface 100 may then estimate a likely time at which a feature is available for use by the application based on its current status (e.g., accounting for any delays and/or early production of a feature). User interface 100 may then select a threshold proximity for generating alerts (e.g., which may be specific to a given team or user). The system may then determine any events that are within the threshold proximity on the application timeline. Upon detecting any events, user interface 100 may generate an alert to users involved with features corresponding to the determined events. By doing so, user interface 100 may identify events (e.g., other features being available to an application) that are temporally relevant to a given feature being available for use by the application as well as filter those events based on the threshold proximity.

As referred to herein, a "code string" may comprise a program or sequence of instructions. In some embodiments, the code string may comprise a program or sequence of instructions that is interpreted or carried out by another program rather than by the computer processor (as a compiled program is). A code string may comprise one or more instructions and/or relate to one or more functions performed based on the instructions.

In some embodiments, the code string may comprise a code written in a particular language. As referred to herein, code may refer to the set of instructions or a system of rules written in a particular programming language (e.g., source code). In some embodiments, code may refer to source code after it has been processed by a compiler and made ready to run on the computer (e.g., the object code). As described herein, source code may be any collection of text, with or without comments, written using a human-readable programming language, usually as plain text. For example, the source code of a program is specially designed to facilitate the work of computer programmers who specify the actions to be performed by a computer mostly by writing source code. The source code may be transformed by an assembler or compiler (e.g., of the system) into binary machine code that can be executed by the computer. The machine code is then available for execution at a later time. For example, the machine code may be executed to perform one or more functions of an application feature and/or an application.

In some embodiments, user interface 100 may allow a user to select one or more code string attributes. Code string attributes may include any characteristic of a code string. These characteristics may comprise a type of data used, an algorithm used, data preparation and/or selection steps, and/or any other characteristic of one code string that distinguishes it from another. The system may also present information about the software development process, as shown in FIG. 1. For example, the system may present information (e.g., information 102) about users, roles, playbooks, learning resources, forums, and/or progress indicators for software development, as shown in user interface 100.

User interface 100 may allow for tracking and mitigating software programming workflow issues. For example, user interface 100 may provide a key functionality to filter the details of code string production based on the selection of a domain or a manager making the view specific for their tracking, enabling them to track in an efficient way, perform modifications to a code string, and/or run a feature test on a code string. For example, the system may allow a user to perform a feature test prior to performing a pull request for the application feature. A pull request is a mechanism for a developer to notify team members that they have completed a feature. Once their feature branch is ready, the developer files a pull request allowing other developers involved in the application development to know that an application feature is ready for review and merging into a main branch.

In some embodiments, the system may allow a user to designate, retrieve, and/or access a feature programming workflow. As referred to herein, a feature programming workflow may comprise supplemental data for performing a feature test. For example, a feature programming workflow may comprise rules for testing run-time test traffic for a designated, compartmentalized application feature. Additionally, or alternatively, a feature programming workflow may comprise data for supplementing the first application feature to allow the first application to execute the first function. For example, the system may select a first feature programming workflow from a plurality of feature programming workflows, wherein each feature programming workflow of the plurality of feature programming workflows comprises data for supplementing the first application feature to allow the first application to execute the first function.

In some embodiments, a feature programming workflow may store features, scenarios, and feature descriptions to be tested. The feature programming workflow is an entry point to write the tests and is used as a live document at the time of testing. The tests of the feature programming workflow may comprise a scenario in a Given/When/Then format, which describes various characteristics for testing the feature. The file may provide a description of a feature test in a descriptive language (e.g., a human-readable text). The file may also comprise an automation test code string (e.g., data for supplementing a feature test such as variables to test or supplement in run-time data) as well. A feature programming workflow may contain a scenario or may contain many scenarios in a single feature programming workflow. Using the feature programming workflow, the system may correlate with all source systems, do complex calculations, and automatically generate the run-time traffic data upon which the native data and/or alert data may be generated.

For example, the system may store native data corresponding to fields of the software development lifecycle tool. The native data may include data-related run-time data generated by a first code string that executes a function for the application feature, wherein executing the function generates run-time function traffic. For example, the first code strings may comprise a series of steps that the software development lifecycle tool iterates through to test the security of any inputted code strings by running a function of the code strings (e.g., in a black box arrangement). The series of steps may include executing one or more dependencies (e.g., specific operations, functions, etc.) applied while testing an inputted code string. The first code strings may also have dependency branches. As the first code string iterates through its dependencies, it may determine to follow one dependency branch over another. For example, each dependency branch may correspond to a particular type of inputted code strings, a particular code string attribute of an inputted code string, data inputs of an inputted code string, etc. The dependency branches for the workflow may be comprehensive for any type of inputted code string that is detected. For example, the dependency branches may have branches devoted to every type of code string. Then, for each code string attribute, data input, etc., the system iterates along specific branches (or sub-branches) corresponding to each code string attribute, data input, etc., corresponding to an inputted code string. Through this structure, the software development lifecycle tool may receive different types of code strings and provide validations therefor. In some embodiments, the feature programming workflow may supplement the current data in the feature application (or code strings) by mimicking data and/or a dependency that is not yet available (e.g., due to the early stage of development) for the feature application.

The system may also comprise a feature programming workflow for the first application feature, wherein the feature programming workflow executes a feature test, wherein executing the feature test generates run-time feature test traffic. For example, the feature programming workflow may comprise a series of steps that the software development lifecycle tool iterates through to test the functionality of any inputted code strings by testing security credentials, APIs, certificates, etc. The series of steps may include one or more parameters, operations, functions, etc., to be applied while testing an inputted feature.

User interface 100 also includes native data for a plurality of C feature programming workflows. Native data or native data formats may comprise data that originates from and/or relates to a respective feature programming workflow, the software development lifecycle tool, and/or their respective plugins. In some embodiments, native data may include data resulting from native code, which is code written specifically for a given feature programming workflow, the software development lifecycle tool, and a respective plugin designed therefor. For example, as shown in user interface 100, the system may generate a graph, which may comprise native data. In some embodiments, native data for multiple feature programming workflow may be displayed simultaneously (e.g., in a side-by-side comparison).

For example, native data may comprise native data values or native data formats and may further comprise data that originates from and/or relates to a respective feature programming workflow, the software development lifecycle tools, and a respective plugin designed therefor. In some embodiments, native data may include data resulting from native code, which is code written specifically for the code development control system, the feature programming workflow, the software development lifecycle tools, and/or a respective plugin designed therefor. For example, the native data for the first code strings and the second feature programming workflow may comprise respective raw data inputs and/or data outputs and plot views. In some embodiments, the system may determine a first security characteristic of the first application feature using the first feature programming workflow. The system may determine a second security characteristic of the first application feature using the second feature programming workflow. The system may determine a difference in the first security characteristic and the second security characteristic. The system may then determine the alert data based on the difference.

For example, the system may generate a feature programming workflow (or benchmark test) based on the native code and/or dataset of one or more feature programming workflows. The feature programming workflows may describe a particular feature test for a particular feature application. The system may then compare the benchmark feature programming workflows to the one or more plurality of feature programming workflows. For example, the benchmark code strings may comprise a feature programming workflow generated by the system based on the native code and/or dataset of one or more code strings of the previously validated feature programming workflow. For example, the native code and/or dataset of one or more feature programming workflows may comprise the dataset upon which the other code strings were trained, tested, and/or compared. For example, the benchmark feature programming workflows may also share one or more feature programming workflow attributes with the one or more feature programming workflows of the previously validated code strings. However, the benchmark code strings may also include different feature programming workflow attributes. For example, the benchmark feature programming workflows may include a feature programming workflow attribute (e.g., a specific data preparation, algorithm, architecture, parameter value, etc.) that differs from the one or more feature programming workflows of the previously compared code strings. Based on these differences, the benchmark code strings may generate different results from the originally validated feature programming workflow. These differences may then be compared using alert data (e.g., alert data 106). For example, in some embodiments, alert data (e.g., alert data 106) may comprise quantitative or qualitative alerts of differences in data (e.g., compliance metric 110).

In some embodiments, native data may include a roadmap for a feature programming workflow (e.g., available via icon 108). For example, in some embodiments, the system may allow a user to update and/or edit the source code for an inputted feature programming workflow. For example, the system may receive a user modification to the source code for an inputted code string and then store the modification to the source code for an inputted feature programming workflow. The system may then generate for display the inputted code string (or native data for the inputted code strings) based on the modification to the source code. For example, the system may allow users having a given authorization to edit source code subject to that authorization. In such cases, the source code may have read/write privileges. Upon generating the source code for display, the system may verify that a current user has one or more read/write privileges. Upon verifying the level of privileges, the system may grant the user access to edit the source code.

User interface 100 may also include other alert data. Alert data may be presented in any format and/or representation of data that can be naturally read by humans. In some embodiments, the alert data may appear as a graphical representation of data. For example, the alert data may comprise a graph of the first code string alert and/or a level of performance of a feature programming workflow. In such cases, generating the graph may comprise determining a plurality of code string alerts for different code strings and graphically representing a description of the plurality of code string alerts. In some embodiments, the description of the native data to the first code string alert may comprise a graphical display describing a hierarchal description of the first workflow of code string dependencies and the second workflow of code string dependencies. For example, the software development lifecycle tool may indicate differences and/or provide recommendations for adjustments to an inputted feature programming workflow. In some embodiments, alert data may comprise a quantitative or qualitative description of a likelihood that code string may be vulnerable to a vulnerability.

For example, the alert data may be presented in any format and/or representation of data that can be naturally read by humans (e.g., via a user interface such as user interface 100 (FIG. 1)). In some embodiments, the alert data may appear as a graphical representation of data. For example, the alert data may comprise a graph or chart of the first code string alert. In such cases, generating the graph may comprise determining a plurality of code strings for generating the first code string alert and graphically representing a description of the plurality of code strings (e.g., as shown in FIG. 1). In some embodiments, the description of the native data to the first code string alert may comprise a graphical display describing a description of a result of a feature test on a feature programming workflow.

In some embodiments, the alert data further comprises a recommendation for an adjustment to a feature programming workflow. The system may recommend one or more adjustments to a feature programming workflow in order to reduce risk in the code strings. For example, the system may generate a recommendation for an adjustment to the code strings data input or the second code strings attribute. For example, the system may generate a recommendation of an alternative technique (e.g., a different feature programming workflow attribute) for use in the second feature programming workflow. Additionally, or alternatively, the alert data may further comprise an effect of the description on the security characteristic of the first application feature using the second feature programming workflow. For example, the system may generate a feature programming workflow attribute that describes an effect of the current feature programming workflow.

Figure 2A:
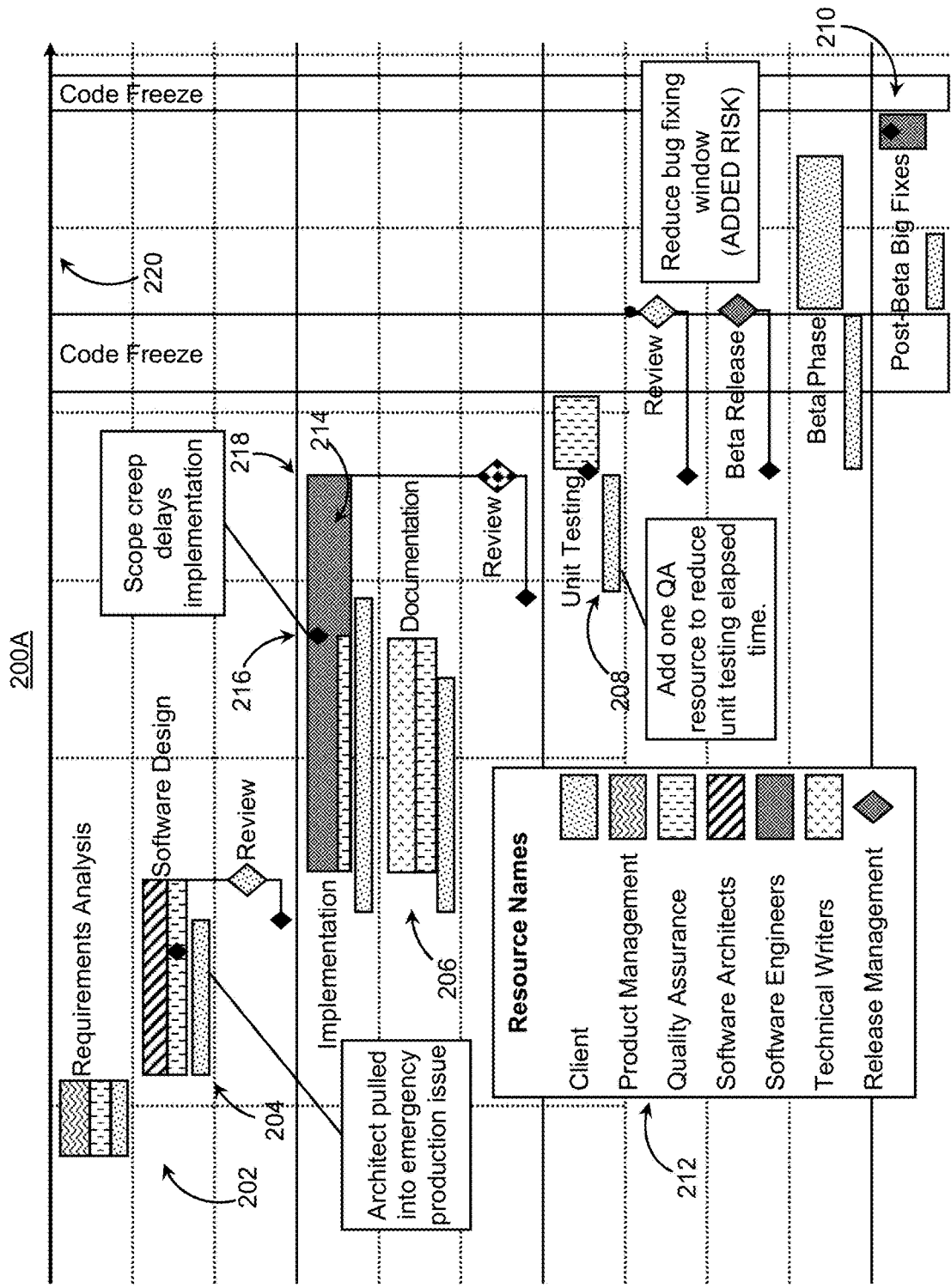
FIG. 2A shows an illustrative diagram for an event timeline, in accordance with one or more embodiments.

FIG. 2A shows an illustrative diagram for an event timeline, in accordance with one or more embodiments. For example, the system may determine a software programming workflow as represented by diagram 200A. For example, the software programming workflow may correspond to production of an application. The production of the application itself may comprise numerous phases or parts such as the previously discussed beta phase as well as a planning phase, coding phase, building phase, testing phase (which may include the beta phase), deployment phase, operate phase, and/or monitor phase.

For example, during the planning phase, the development team collects input from stakeholders involved in the project such as customers, sales, internal and external experts, and developers. This input is synthesized into a detailed definition of the requirements for creating the desired software. The team also determines what resources are required to satisfy the project requirements and then infers the associated cost. The coding phase includes system design in an integrated development environment. It also includes static code analysis and code review for multiple types of devices. The building phase takes the code requirements determined earlier and uses those to begin actually building the software. The testing phase entails the evaluation of the created software. The testing team evaluates the developed product(s) in order to assess whether they meet the requirements specified in the 'planning' phase. Assessments entail the performance of functional testing: unit testing, code quality testing, integration testing, system testing, security testing, performance testing, and acceptance testing, as well as nonfunctional testing. If a defect is identified, developers are notified. Validated (actual) defects are resolved, and a new version of the software is produced. The release phase involves the team packaging, managing, and deploying releases across different environments. In the deployment phase, the software is officially released into the production environment. The operate phase entails the use of the software in the production environment. In the monitor phase, various elements of the software are monitored. These could include the overall system performance, user experience, new security vulnerabilities, an analysis of bugs or errors in the system.

For example, computer programming is typically a team-based activity in which the responsibilities for the features and source code necessary to produce a given project (e.g., a software application) are shared among team members. In such cases, multiple streams of code and/or software programming teams interact with each other to produce one or more applications, each of which may perform one or more features and/or functions. To facilitate this team activity, team members may submit contributions to the project to a distributed version control system. This system may include a codebase that features a full history of the project that is mirrored on every contributor's computer. The system may enable automatic management of different branches of the project as well as the merging of different contributions. The team may also utilize one or more issue management and bug-tracking tools. The team may further out-source some issues to software-as-a-service providers. Accordingly, project management for computer programming often involves multiple team members and service providers sharing multiple versions of a single codebase for the project.

Diagram 200A may represent a software programming workflow as managed by a software development tool. The tool may include a codebase that features a full history of the project. In some embodiments, the system may mirror the codebase on every contributor's computer as well as enable automatic management of different branches of the application.

Diagram 200A illustrates a portion of the software programming workflow, which includes events corresponding to the beginning of the planning phase (e.g., event 202), coding phase (e.g., event 204), building phase (e.g., event 206), testing phase (e.g., event 208), and deployment phase (e.g., event 210). During each of these phases, numerous resources or users are each contributing to production of the application as shown in legend 212. The numerous resources may contribute to production by contributing to individual features of the production.

As described herein, a feature may comprise a portion of an application. For example, a feature may comprise a portion that distinguishes itself from other portions. For example, a feature may comprise the development of a function of an application, but a feature may also refer to a phase attributed to a function (e.g., the planning phase, coding phase, building phase, testing phase, deployment phase, operate phase, and/or monitor phase of the function) as well as a contribution to a function of a specific function.

The application may comprise a plurality of features and each feature may correspond to an event on the application timeline (e.g., timeline 220) represented by diagram 200A. For example, the application timeline may comprise a plurality of events, wherein each event of the plurality of events indicates relevant points in time and/or time periods for a feature, application, and/or production. For example, an event may comprise a point in time when a phase for a feature, application, etc., is begun, ends, and/or when a respective feature of the plurality of features is available for use by the application.

Each feature may comprise its own feature programming workflow (e.g., workflow 214). The feature programming workflow may indicate one or more events specific to the production of the feature. For example, the system may determine a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application. As indicated by diagram 200A, the locations at which different events of a feature programming workflow correspond to timeline 220 may change (e.g., as scope creep delays implementation). For example, an initial location (e.g., point 216) on timeline 220 at which a first feature that was supposed to be available for use by the application has been dynamically adjusted to reflect a delay (e.g., adjusted to point 218).

For example, the system may determine a first location, in the application timeline, of the first event based on a current status of the software programming workflow. For example, the system may receive data from one or more sources that indicate a status of a feature and/or feature programming workflow. In some embodiments, this may comprise a system (e.g., manually, or automatically) updating a completion date in a log for the feature. For example, the system may determine a number of events corresponding to the plurality of features that are in compliance with an initial application timeline for software programming workflow and determine the current status based on the number of events.

In some embodiments, the system may determine a likely or predicted completion date based on a current status of other events, features, applications, etc. For example, the system may determine an outcome of a previous phase and monitor all phases to run sequentially. The system may provide a tangible output (e.g., a specific date) for the end of each phase, feature programming workflow, etc. The system may also monitor ongoing release cycles, each featuring small, incremental changes from a previous release cycle. At each iteration, the system may update other events.

In some embodiments, the system may dynamically determine when a given feature will be available based on whether production timelines corresponding to one or more other features are met. For example, the system may continually and/or on a predetermined schedule determine whether or not the current status of a given feature is in compliance. For example, the system may determine a current date. The system may determine a predicted status of one of the plurality of features at the current date. The system may determine an actual status of one of the plurality of features at the current date. The system may compare the predicted status to the actual status to determine the current status.

In some embodiments, the system may dynamically determine when a given feature will be available based on whether production timelines corresponding to one or more other features are met. For example, the system may continually and/or on a predetermined schedule determine whether one or more timelines for one or more features is in compliance. For example, the system may determine a number of events corresponding to the plurality of features that are in compliance with an initial application timeline for software programming workflow. The system may determine the current status based on the number of events.

In some embodiments, the system may dynamically determine when a given feature will be available based on whether production timelines corresponding to one or more other features are met. For example, the system may determine a frequency at which events are in compliance with an initial application timeline for software programming workflow. For example, the system may determine a frequency at which events corresponding to the plurality of features are in compliance with an initial application timeline for software programming workflow. The system may determine the current status based on the frequency.

In some embodiments, the system may dynamically determine when a given feature will be available based on whether production timelines corresponding to one or more other features are met. For example, the system may determine an average delay at which features previously made available to the application were made available to the application. The system may determine an average delay for previous events on the application timeline. The system may determine the current status based on the average delay.

For example, the system may determine various events for one or more features in order to generate alerts. The alerts may be issued to a subset of users (e.g., users corresponding to a given resource, feature, application, etc.). For example, the system may provide centralized communication across feature programming workflows using software development lifecycle tools that dynamically determine temporal alerts. That is, as opposed to generating all alerts related to an application, the system may generate alerts that are dynamically determined to be temporally relevant. By dynamically determining events that are temporally relevant, the system may account for changes in an application timeline that may comprise a plurality of events, in which each event of the plurality of events indicates when a respective feature of the plurality of features is available for use by the application, and in which the location of each event constantly changes.

However, simply determining events that are temporally relevant may still not be sufficient in minimizing bottlenecks. For example, teams or users may still be flooded with temporally relevant events and any alert needs to be generated with enough time to allow for the alert to be acted on. Accordingly, to determine events for which alerts will be generated, the system may determine a current status of a software programming workflow (e.g., a workflow for one of the features of the application). The system may then estimate a likely time at which a feature is available for use by the application based on its current status (e.g., accounting for any delays and/or early production of a feature). The system may then select a threshold proximity for generating alerts (e.g., which may be specific to a given team or user). The system may then determine any events that are within the threshold proximity on the application timeline. Upon detecting any events, the system may generate an alert to users involved with features corresponding to the determined events. By doing so, the system may identify events (e.g., other features being available to an application) that are temporally relevant to a given feature being available for use by the application as well as filter those events based on the threshold proximity.

The system may retrieve a threshold proximity for generating alerts for a second feature programming workflow. The system may determine a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application. The system may generate for display, in a user interface of a software development lifecycle tool for the second feature, an alert based on the first location.

In some embodiments, the threshold proximity may be different for each feature application workflow. For example, the system may select a threshold proximity based on a lead time required by a given feature application workflow for changes to its timeline. For example, the lead time may depend on a current status (or stage in development) for the feature programming workflow. In some embodiments, the threshold proximity may be different for each feature application workflow and/or based on the status of other feature application workflows. For example, the system may select a threshold proximity based on whether another feature application is delayed or will be released ahead of schedule (e.g., non-compliance with a current timeline). For example, sudden changes in scheduling may increase the urgency at which a feature may need to be completed and/or may introduce additional delays into the development cycle. As such, the system may modify the length of the threshold proximity to capture events resulting from non-compliance with a current timeline. In some embodiments, the system may determine which feature programming workflows (or users corresponding to the feature programming workflows) for which alerts should be generated. For example, the system may determine different workflows that correspond to the same users. The system may then generate alerts to those users.

Figure 2B:
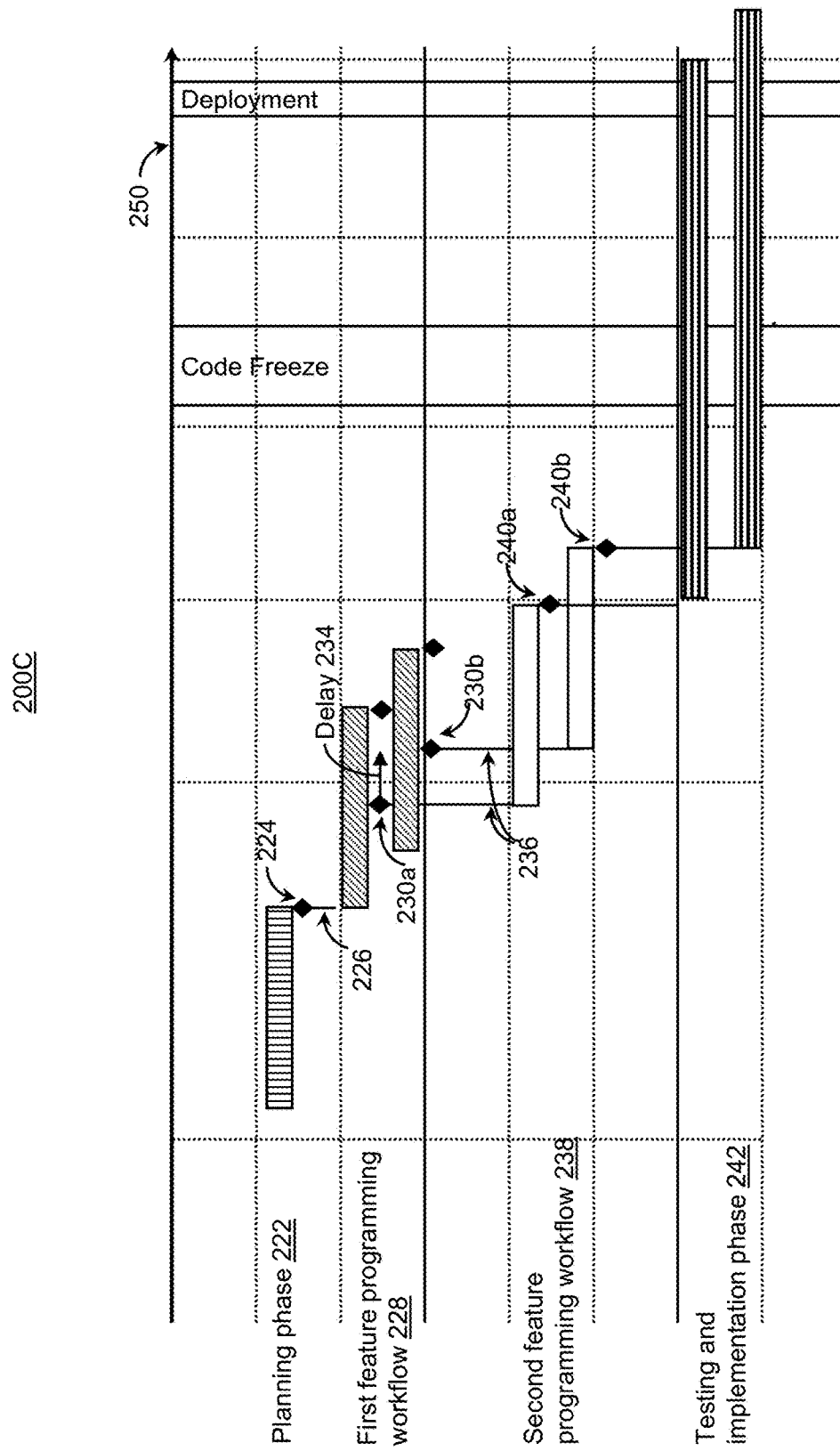
FIG. 2B shows an illustrative diagram for an event timeline, in accordance with one or more embodiments.

FIG. 2B shows a diagram 200B for an event timeline 250, in accordance with one or more embodiments. For example, the system may determine a software programming workflow as represented by the diagram 200B. In some embodiments, the software programming workflow of FIG. 2B can be the same as, or similar to, the software programming workflow of FIG. 2A. In an example, the software programming workflow may correspond to production of an application. The production of the application itself may comprise numerous phases or parts such as the previously discussed beta phase as well as a planning phase, coding phase, building phase, testing phase (which may include the beta phase), deployment phase, operate phase, and/or monitor phase. It will be understood that the diagram 200B represents certain portions of a software programming workflow, but that other examples can have fewer, or more feature programming workflows. Further, while the diagram 200B is described with respect to a delay 234 associated with one or more tasks involved in a first feature programming workflow 228 affecting a second feature programming workflow 238, it will be understood that any combination of dependencies can exist between the first feature programming workflow 228 and the second feature programming workflow 238 that may, or may not, affect the progress of the first feature programming workflow 228 or the second feature programming workflow 238.

As shown in diagram 200B, event timeline can include a planning phase 222. For example, the planning phase 222 can be the same as, or similar to, the planning phase described above. During the planning phase 222, a development team can collect input from stakeholders that is used to generate one or more feature programming workflows including the first feature programming workflow 228 and the second feature programming workflow 238. The planning phase 222 can start at a first point in time, can extend for a period of time, and upon completion (event 224) can allow for the first feature programming workflow 228 and the second feature programming workflow 238 to begin.

In some embodiments, the planning phase 222 can be associated with a dependency 226 that affects the execution of one or more operations involved in the first feature programming workflow 228. For example, the planning phase 222 can be associated with a dependency 226 that involves completing, or substantially completing, the planning phase 222, indicating that developers, etc., have defined one or more tasks that must be completed during the first feature programming workflow 228 and the second feature programming workflow 238. These tasks can occur at varying points in time associated with the periods of time (e.g., indexed by the event timeline 250) during which the first feature programming workflow 228 and the second feature programming workflow 238 are executed. For purposes of clarity, individual tasks are not illustrated, however it will be understood that multiple individual tasks can be associated with the first feature programming workflow 228 and the second feature programming workflow 238.

In some embodiments, the first feature programming workflow 228 can be associated with one or more tasks involved in completing a feature (e.g., a first feature) for an application developed in accordance with the software programming workflow. At a point in time when the planning phase 222 is completed, or substantially completed, the first feature programming workflow 228 can begin. During the completion of various tasks involved in the first feature programming workflow 228, progress can be made as represented in the diagram 200B. Some examples, one or more of the tasks may be delayed. This delay can be attributed to, for example, unclear requirements, inefficient task reviews, inaccurate estimations, technical debt, scope creep, communication breakdowns, team dependencies, resource constraints, work-in-progress overload, and unexpected technical challenges. As shown in diagram 200B, the first feature programming workflow 228 can be affected by a delay 234. This delay 234 can likewise delay the completion of a task (e.g., event 230*a*) on which the second feature programming workflow 238 is dependent as represented by dependency 236. As a result, the task may be completed at a later point in time than is expected (e.g., event 230*b*) and, by virtue of the offset of dependency 236, the second feature programming workflow 238 can start at a later point in time than expected. This can likewise cause a delay in the completion of the second feature programming workflow 238, Resulting in an anticipated completion of the second feature programming workflow 238 (e.g., event 240*a*) being delayed and ultimately completed after a period of time (e.g., event 240*b*).

Upon completion of the second feature programming workflow 238, which is dependent on one or more tasks being completed during the first feature programming workflow 228 as illustrated by dependency 236, a testing and implementation phase 242 can begin. Again, by virtue of the delay 234 attributed to the completion of one or more tasks from the first feature programming workflow 228, the testing and implementation phase 242 can likewise be delayed. This can result in one or more delays to downstream processes such as code freezes and deployment.

With continued reference to FIG. 2B, a system such as a workflow management system as described herein, can be configured to analyze the software programming workflow and monitor the completion of tasks associated with the first feature programming workflow 228 and the second feature programming workflow 238 to generate one or more alerts as described herein. For example, the system can obtain a software programming workflow developed as part of the planning phase 222. The system can then determine that the software programming workflow includes a first feature programming workflow and a second feature programming workflow that are both to be completed during development of an application. This software programming workflow can include a plurality of events that are identified by the system as being assigned to either the first feature programming workflow 228 or the second feature programming workflow 238. In some examples, the system can also determine that one or more of the events described herein are dependent on one or more other events as represented by dependency 236, and that delays in successful completion of one or more portions of the first feature programming workflow 228 on which the second feature programming workflow 238 depends can result in delays to the completion of the second feature programming workflow 238.

In the example illustrated, the system can determine feature states at one or more points in time for the first feature programming workflow 228 and the second feature programming workflow 238. For example, prior to the point at which the delay 234 occurs, the system can determine that one or more tasks for the first feature programming workflow have been completed and the status for the first feature programming workflow 228 indicates that the first feature is being developed on time and/or in accordance with the software programming workflow established during the planning phase 222. The system can similarly determine a second feature state at the same points in time that one or more tasks of the second feature programming workflow 238 have not yet been started by virtue of their dependence on tasks from the first feature programming workflow 228 not being completed. In this example, the system can similarly determine that the status for the second feature programming workflow 238 indicates the second feature is being developed on time and/or in accordance with the software programming workflow.

Over time, the system can monitor and analyze the progress associated with the first feature programming workflow 228 and the second feature programming workflow 238 and determine whether or not the tasks associated with each are being completed on time or are delayed, as well as whether or not the delays associated with one or more tasks are affecting other downstream tasks dependent on the delayed tasks. For example, the system can monitor the first feature programming workflow 228 and determine that the delay 234 is affecting development associated with the second feature programming workflow 238 by virtue of the dependency 236. The system can then determine additional delays, such as delays applicable to the testing and implementation phase 242, resulting from the delay 234. In some embodiments, the system can then determine a global programming that is for the software programming workflow based on the status of the first feature programming workflow 228 and the second feature programming workflow 238, as well as the dependency 236. This global programming status can indicate that the software programming workflow is on time, delayed, etc., and in this case at the first feature programming workflow 228 is delaying the second feature programming workflow 238 from commencing, resulting in an overall delay to the software programming workflow.

In some examples, the system can generate an indication of the state of the first feature (e.g., a first feature state) or the state of the second feature (e.g., a second feature state) to indicate the status of each of the first feature programming workflow 228 and the second feature programming workflow 238. This can include, for example, an indication of the overall status of each of the feature programs or indications of individual tasks involved in each of the feature program workflows. In some examples, the indication can also be generated to represent the dependency 236 that is causing the delay in execution of the second feature programming workflow 238. As described herein, the indication can also include information about each of the feature programming workflows such as one or more individuals involved in, or otherwise affected by, the delay 234, information about the tasks contributing to the delay 234, information about upstream or downstream tasks affected by the delay 234 by virtue of the 236 or subsequent dependencies, etc. Additional details with respect to the identification of feature states, and corresponding delays, are described with respect to the system architecture 360 of FIG. 3C.

Figure 2C:
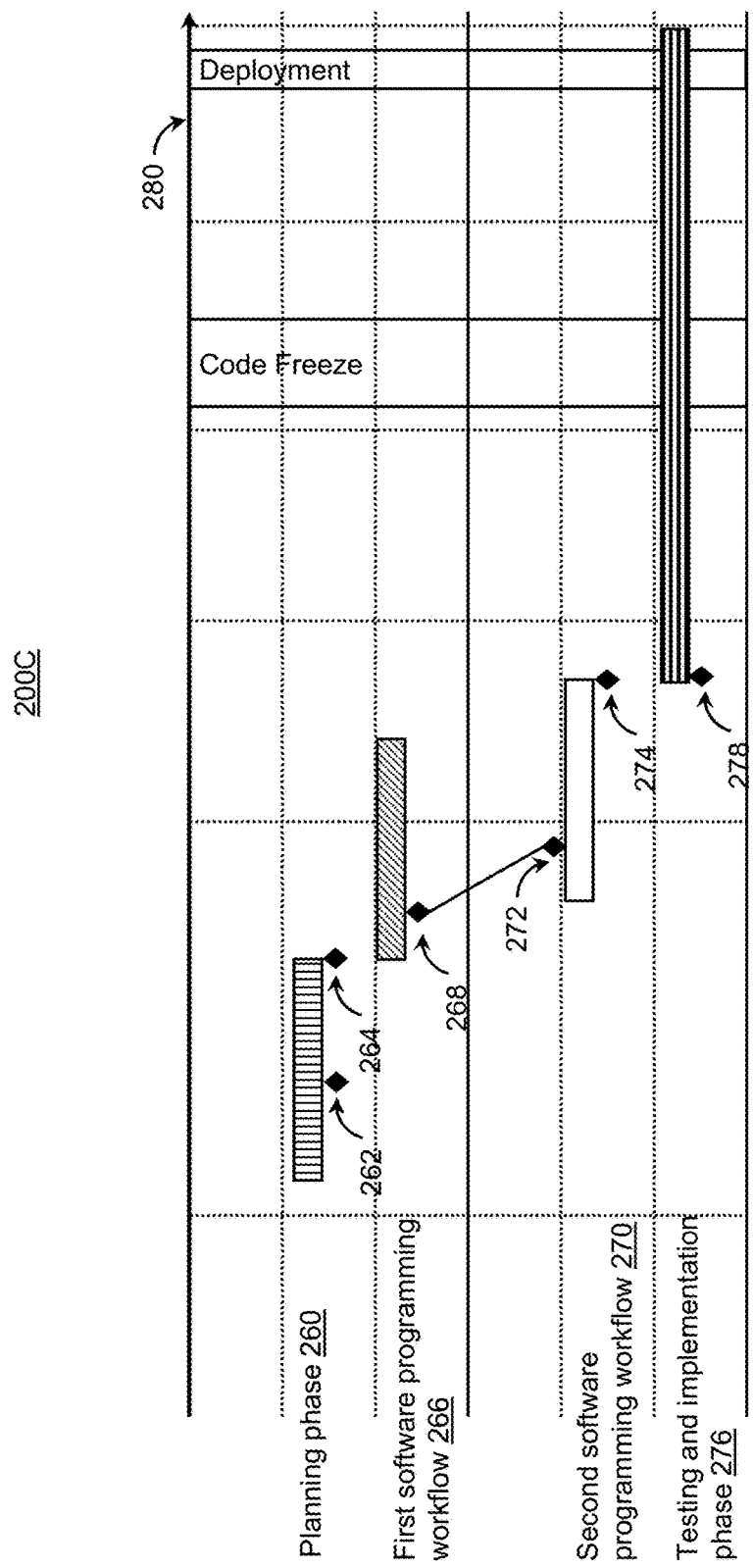
FIG. 2C shows an illustrative diagram for an event timeline, in accordance with one or more embodiments.

FIG. 2C shows a diagram 200C for an event timeline 280, in accordance with one or more embodiments. For example, the system may determine a first software programming workflow and a second software programming workflow as represented by the diagram 200C. In some embodiments, the first software programming workflow and the second software programming workflow of FIG. 2C can be the same as, or similar to, the software programming workflows of FIGS. 2A and/or 2B. In an example, the software programming workflows may correspond to production of an application (e.g., a single application) or two separate applications. The production of the application(s) may comprise numerous phases or parts such as the previously discussed beta phase as well as a planning phase, coding phases, building phases, testing phases (which may include the beta phase), deployment phases, operation phases, and/or monitor phases. It will be understood that the diagram 200C represents certain portions of a first and second software programming workflow, but that other examples can have fewer, or more software programming workflows. Further, while the diagram 200C is described with respect to event 268 and event 272 that are the same as, or similar to, each other, it will be understood that any combination of events can exist between the first software programming workflow 266 and the second software programming workflow 270 that may, or may not, be the same as, or similar to, each other.

As shown in diagram 200B, the event timeline can include a planning phase 260. For example, the planning phase 260 can be the same as, or similar to, the planning phase described above. During the planning phase 260, a development team can collect input from stakeholders that is used to generate one or more software programming workflows including the first software programming workflow 266 and the second software programming workflow 270. The planning phase 260 can start at a first point in time, can extend for a period of time, and can involve at least one task (e.g., event 262). Upon completion of the planning phase 260 (event 264), the first software programming workflow 266 and the second software programming workflow 270 to begin.

In some embodiments, the first software programming workflow 266 can be associated with an event 268 that is involved in completing one or more tasks associated with the first software programming workflow 266. For example, the first software programming workflow 266 can be associated with an event 268 that involves generating code that corresponds to one or more user interface components, one or more data management operations, one or more authentication and or authorization processes, one or more API integrations, etc. This event 268 can share similarities with one or more events associated with the second software programming workflow 270. For example, the event 268 can be the same as, or similar to, the event 272 of the second software programming workflow 270. In certain examples, the first software programming workflow 266 and the second software programming workflow 270 can be involved in generating two different applications or portions of the same application. As will be understood, the event 268 and the event 272, if completed by separate software developers without knowledge of the other, can result in the duplication of code by the two separate developers involved in executing the first software programming workflow 266 and the second software programming workflow 270, respectively.

In some embodiments, the first software programming workflow 266 and the second software programming workflow 270 can be involved in a testing and implementation phase 276. For example, once the first software programming workflow 266 and the second software programming workflow 270 are completed, including events 268, 272, and 274, portions of the code generated as a result can Undergo testing and implementation (e.g., event 278).

With continued reference to FIG. 2C, a system such as a workflow management system as described herein, can be configured to obtain it first software programming workflow having a first set of events and a second software programming workflow having a second set of events. For example, the system can obtain the first software programming workflow, and the second software programming workflow based on input provided by software developers during the planning phase 260. The system can then determine a first set of events and a second set of events for the first and second software programming workflows, respectively, that are involved in the execution of each of the workflows. In some examples, at least a subset of one or more of the events from each of the workflows can be the same as or similar to one or more of the events from the other workflow.

In some environments, the system can analyze portions of the first software programming workflow and the second software programming workflow to determine that one or more events from each corresponds to one another period for example, where two applications are being developed and both applications share a common event involving authentication of users before execution of one or more operations, the system can analyze the portions of the first and second software programming workflows corresponding to these events and determine that these events are the same as, or similar to, one another. For example, the system can analyze code portions of the first software programming workflow and the second software programming workflow by comparing structural and semantic features, such as control flow graphs or abstract syntax trees, to identify similarities in logic or design patterns across different portions of the first software programming workflow and the second software programming workflow. The system can then determine a first date for the first event and a second state for the second event and selectively cause display devices associated with developers for either or both of the software programming workflows to generate user interfaces including status indications of the event or events common to one another. In this way, the system can identify similarities across separate software programming workflows, determine whether to provide indications of the similarities to corresponding software developers based on the status of the corresponding portions of the software programming workflows, and selectively cause user interfaces to be displayed add corresponding computing devices. Additional details with respect to the identification of feature states, and corresponding delays, are described with respect to the system architecture 380 of FIG. 3D.

Figure 3A:
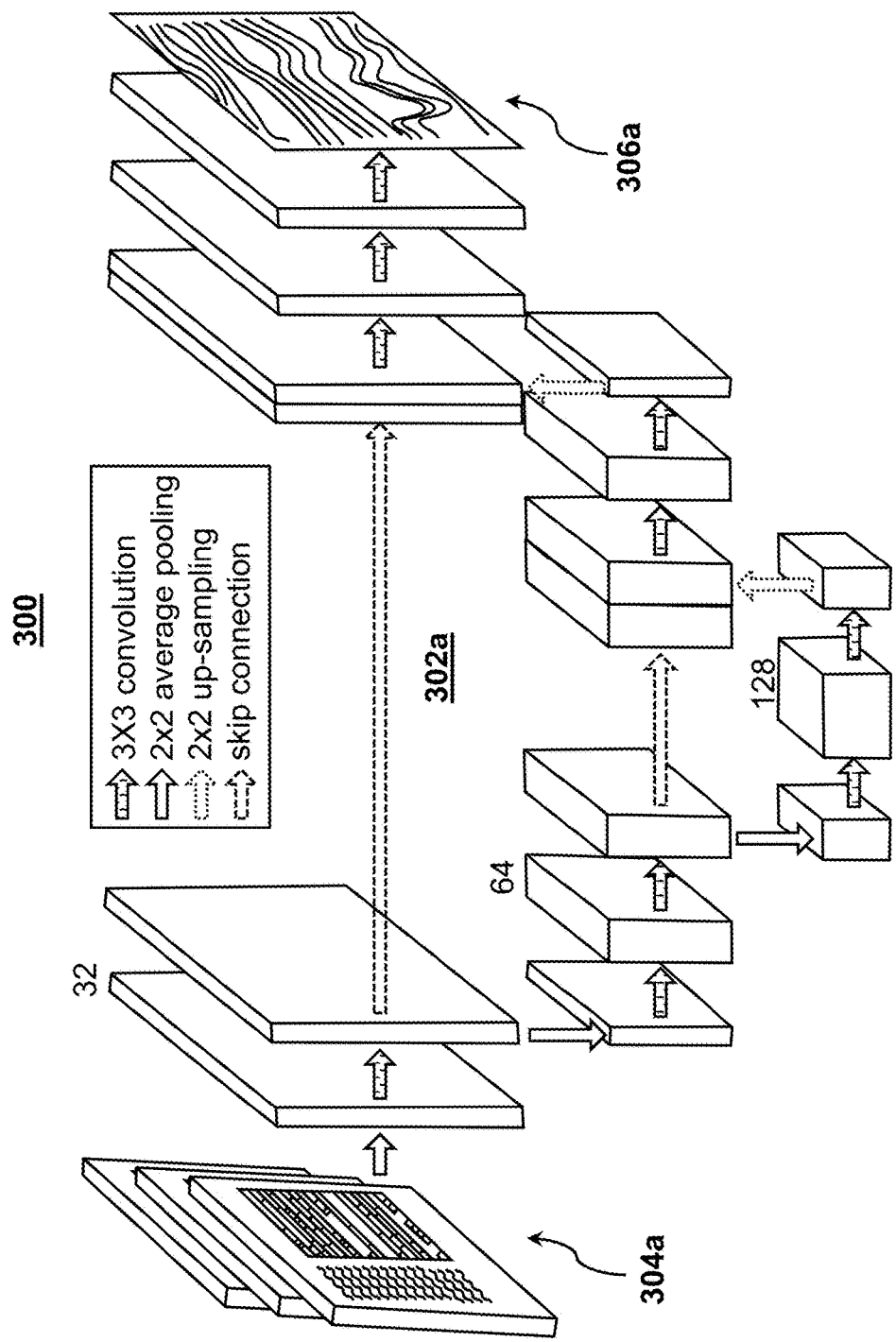
FIGS. 3A and 3B show illustrative components for a system used to provide centralized communication across feature programming workflows, in accordance with one or more embodiments.

FIG. 3A shows illustrative components for a system used to provide centralized communication across feature programming workflows using software development lifecycle tools that dynamically determine temporal alerts in accordance with one or more embodiments. For example, FIG. 3A may show illustrative components for a software development lifecycle tool as used by system 300.

System 300 also includes model 302a, which may be a machine learning model, artificial intelligence model, etc., (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train the model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a current status of a software programming workflow, a location of an event, etc.).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions. In some embodiments, the model (e.g., model 302a) may automatically perform actions based on outputs 306a. In some embodiments, the model (e.g., model 302a) may not perform any actions.

Figure 3B:
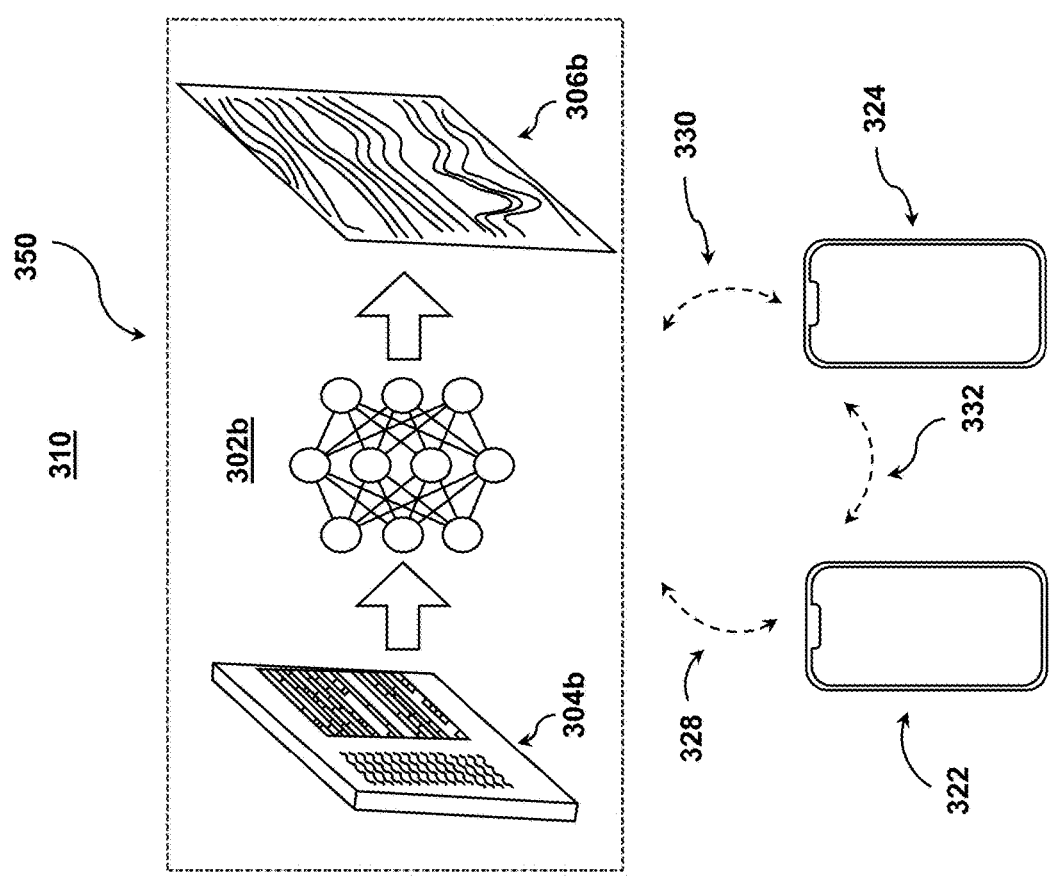

As shown in FIG. 3B, system 310 may include mobile device 322 and mobile device 324. While shown as a smartphone, respectively, in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system and may feature one or more component devices. It should be noted that, while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 310.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the internet, a mobile phone network, a mobile voice, or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user device 322 or mobile device 324 (e.g., a user terminal). Alternatively, or additionally, API layer 350 may reside on one or more of cloud components. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation, and inhibition for model 302 may be more free-flowing, with connections interacting in a more chaotic and complex fashion. During testing, an output layer of model 302b may indicate whether or not a given input corresponds to a classification of model 302b (e.g., a current status of a software programming workflow, a location of an event, etc.).

Model 302b is shown as a convolutional neural network. A convolutional neural network consists of an input layer (e.g., input 304b, hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 3C:
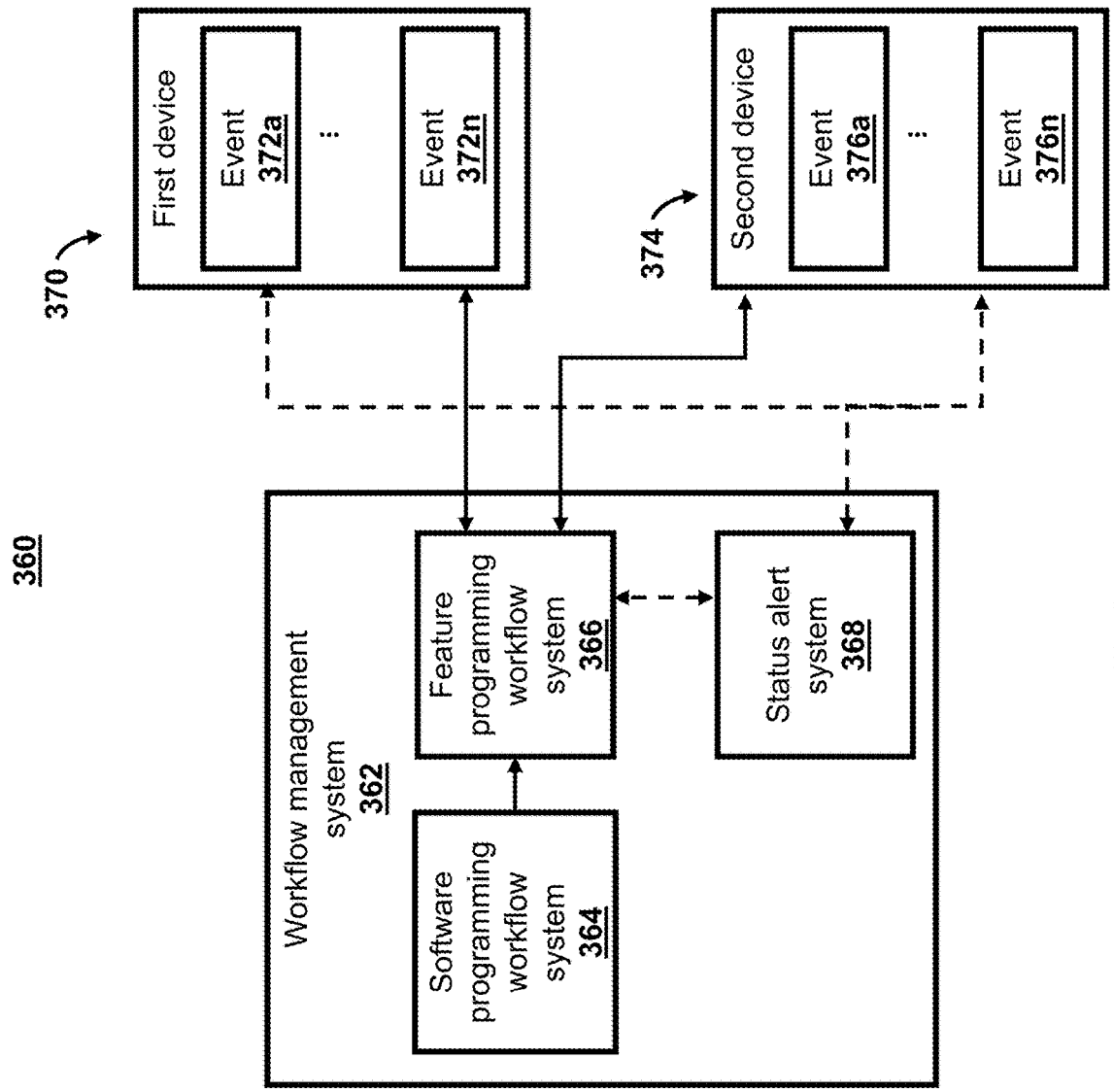
FIG. 3C shows an illustrative diagram of a system architecture for providing centralized communication across feature programming workflows, in accordance with one or more embodiments.

FIG. 3C shows an illustrative diagram of a system architecture 360 for providing centralized communication across feature programming workflows, in accordance with one or more embodiments. For example, the system architecture 360 may be configured to centralize communication across feature programming workflows by providing status indications dependent on operations executed in accordance with a software programming workflow as described herein. In examples described, the software programming workflow may correspond to production of an application. The production of the application itself may include numerous phases or parts such as the previously discussed beta phase, planning phase, coding phase, building phase, testing phase (which may include the beta phase), deployment phase, operate phase, and/or monitor phase, described above.

The system architecture 360 can include a workflow management system 362, a first device 370, and a second device 374, each having, or otherwise being associated with, one or more components as described herein. The workflow management system 362, the first device 370, and the second device 374, including the components thereof, can be configured to interconnect using one or more wired and/or wireless communication connections. As will be understood, the system architecture 360, as illustrated, includes the workflow management system 362, the first device 370, and the second device 374, but similar environments can include more devices that are the same as, or similar to, those described.

The workflow management system 362 can include a computing device that is configured to be in communication with the first device 370 and the second device 374 using one or more communication connections. For example, the workflow management system 362 can include a server, a desktop computer, a laptop computer, a smartphone, a tablet, and/or the like. In some embodiments, the workflow management system 362 can be involved in monitoring a software programming workflow that involves the first device 370 and the second device 374. As described herein, the workflow management system 362 (e.g., one or more components of the workflow management system 362) can establish one or more secured or unsecured communication connections with the first device 370 and the second device 374. The workflow management system 362 can implement a software programming workflow system 364, a feature programming workflow system 366, and/or a status alert system 368.

The first device 370 can include a computing device that is configured to be in communication with the workflow management system 362. For example, the first device 370 can include a server, a desktop computer, a laptop computer, a smartphone, a tablet, and/or the like. In some embodiments, the first device 370 can be involved in (e.g., can direct) the execution of one or more operations to complete one or more events 372a-372n (referred to individually as event 372 and collectively as events 372, where contextually appropriate) involved in a first feature programming workflow. For example, the first device 370 can be operated by an individual such as a software or program developer and can be configured to receive input from the individual during the development life cycle. The first device 370 can then execute one or more operations based on this input from the individual to complete one or more events 372 involved in a software programming workflow. These events 372 can be associated with one or more feature programming workflows. As described herein, the first device 370 can establish one or more secured or unsecured communication connections with the workflow management system 362 and/or the second device 374.

The second device 374 can include a computing device that is configured to be in communication with the workflow management system 362. For example, the second device 374 can include a server, a desktop computer, a laptop computer, a smartphone, a tablet, and/or the like. In some embodiments, the second device 374 can be involved in (e.g., can direct) the execution of one or more operations to complete one or more events 376*a*-376*n* (referred to individually as event 376 and collectively as events 376, where contextually appropriate) involved in a second feature programming workflow. For example, the second device 374 can be operated by an individual such as a software or program developer (e.g., different from the individual operating the first device 370) and can be configured to receive input from the individual during the development life cycle. The second device 374 can then execute one or more operations based on this input from the individual to complete one or more events 376 involved in a software programming workflow. These events 376 can be associated with one or more feature programming workflows (e.g., that are at least in part different from the one or more feature programming workflows). As described herein, the second device 374 can establish one or more secured or unsecured communication connections with the workflow management system 362 and/or the first device 370.

With continued reference to FIG. 3C, the workflow management system 362 can implement and/or execute the software programming workflow system 364. For example, the workflow management system 362 can configure the software programming workflow system 364 to obtain and analyze a software programming workflow including a plurality of feature programming workflows for features of the application being developed. The software programming workflow system 364 can then execute operations (in coordination with the feature programming workflow system 366) to manage communications between a first device 370 and a second device 374 controlled by developers when developing respective portions of the application. In an example, the software programming workflow system 364 can track and monitor the status of the events 372 and events 376 associated with the first feature programming workflow and the second feature programming workflow (respectively) using the software programming workflow system 364 and/or the feature programming workflow system 366, where the events represent tasks that are assigned to be completed by the developers using the first device 370 and the second device 374. While examples described herein involve events 372 associated with the first device 370 being described as dependent on events 376 associated with the second device 374 that are delayed, it will be understood that multiple interdependencies can be established between the events assigned to the users controlling the first device 370 and the second device 374 and that the indications included in the user interfaces described herein can indicate to delays attributable to any combination of users controlling the first device 370 or the second device 374.

In some embodiments, the workflow management system 362 can cause the feature programming workflow system 366 to communicate with, or allow for communication between, the first device 370 and the second device 374 to determine the status of each event 372, 376 and/or the status of corresponding tasks involved in each event 372, 376. For example, when a developer using the first device 370 completes a task associated with the first feature programming workflow or does not complete the task, the workflow management system 362 can record an indication for the event representing this completed or not completed task and share the indication with the feature programming workflow system 366. In examples, completion or non-completion of the event and/or tasks recorded by the workflow management system 362 can trigger subsequent tasks and/or analysis of subsequent tasks (such as dependent tasks) by the feature programming workflow system 366, allowing for automated monitoring of the progression of development activities involved in generating the application. In some examples, the software programming workflow system 364 can determine one or more dependencies between events in the first feature programming workflow and the second feature programming workflow, such as finish-to-start dependencies wherein a task of an event 372 in the first feature programming workflow is configured to begin after the completion of a corresponding task of an event 376 in the second feature programming workflow. In examples, the software programming workflow system 364 can then provide an indication of the one or more dependencies to the feature programming workflow system 366.

In some embodiments, the feature programming workflow system 366 can coordinate with the status alert system 368 to generate user interfaces (e.g., dashboards, etc.) to be displayed at the first device 370 and/or the second device 374 when one or more tasks are delayed. These user interfaces can display the real-time status of the events 372, 376 and/or indications of tasks that are affected within the software programming workflow, allowing developers to monitor progress and identify potential bottlenecks such as events and/or tasks that are incomplete as well as other events that are affected by the incomplete events and/or tasks.

In some embodiments, the feature programming workflow system 366 can determine and track a first feature state for the first feature programming workflow by evaluating the status (e.g., initiated, in progress, delayed, or completed) of a first event 372. For example, the first feature state can indicate the status of the first event 372 including the state of one or more tasks, where each task represents a particular development activity such as design review, coding, testing, etc. that is tracked for progress updates. In some examples, the first feature state can further incorporate information from one or more different events 372 or tasks of the first feature programming workflow that are linked to (e.g., that are dependent on) events 376 of the second feature programming workflow. This, in turn, can allow the feature programming workflow system 366 to determine dependencies between workflows that are based on whether the associated tasks from the events 376 in the second workflow have been completed or remain pending. When one or more tasks (on which the first event 372 depends) within the second feature programming workflow are not completed, the first feature state can be updated to indicate an affected status that delays progress on the first feature programming workflow until the pending tasks are resolved. In some embodiments, the feature programming workflow system 366 can allow real-time integration of statuses from both workflows so that the overall state determination accurately indicates interdependencies between tasks and events 372, 376 across the two feature programming workflows.

In some embodiments, the feature programming workflow system 366 can determine a global programming status for the software programming workflow based on (e.g., indicating) the first status of the first feature programming workflow, the second status of the second feature programming workflow, and the status of one or more dependencies involving at least the first event 372 and a second event 376 of the first feature programming workflow and the second feature programming workflow, respectively. The global programming status can indicate the status of the software programming workflow (e.g., whether it is complete, in progress, delayed, etc.) or the status of one or more tasks associated with the first event 372 in the first feature programming workflow and tasks associated with the second event 376 in the second feature programming workflow. In examples described herein, if a dependency exists where the completion of a task in the first event 372 affects, or is affected by, initiating or completing a task in the second event 376, and this task remains incomplete, the feature programming workflow system 366 can identify this delay and update the global programming status to indicate the impact. In some embodiments, the feature programming workflow system 366 can provide the global programming status for the software programming workflow to the status alert system 368 to allow the status alert system 368 to generate a user interface that indicates one or more aspects regarding the status of the software programming workflow, the first feature programming workflow, or the second feature programming workflow.

In some embodiments, the status alert system 368 can be configured to periodically or continuously obtain the status of the software programming workflow, including the status of the first feature programming workflow or the second feature programming workflow, from the feature programming workflow system 366. The status alert system 368 can then determine whether to generate a user interface at the first device 370 or the second device 374 to indicate to the users of the devices (respectively) that one or more events are delayed or are causing delays. For purposes of clarity, a first event 372 is described as being delayed based on delays attributable to a second event 376. However, it will be understood that any number of events can be delayed based on any number of other events according to which they are dependent also being delayed.

In some embodiments, the status alert system 368 can determine a first user profile that corresponds to the first device 370 when the first event 372 is delayed due to non-completion of one or more tasks of a second event 376. The status alert system 368 can then analyze the completion status of event 372 associated with the first programming workflow and event 376 of the second programming workflow, correlate the completion status with role-specific data (e.g., the assignment of one or more tasks to a user, one or more different tasks on which the user's tasks depend, etc.) indicated by the first user profile, and determine the indication of the first feature state or the second feature state based on the role-specific data. This indication of the first feature state or the second feature state can then be included in a user interface that the status alert system 368 provides to the first device 370 to be displayed thereon to indicate the impact of the delay of the tasks involved in the event 376 on the tasks of the event 372.

In some embodiments, the status alert system 368 can identify delays in tasks that affect events 372 involving the first user profile and generate the indication of the first feature state or the second feature state as a user interface at the first device 370 to indicate whether the user corresponding to the first user profile is behind, or affected by another user that is behind (e.g., the user associated with the second device 374). This user interface can include alerts that inform developers of potential bottlenecks, the user identifier of the user assigned to the delayed event 376, etc., and allow for progress to be consistently monitored and communicated to the user of the first device 370. In some examples, the status alert system 368 can then determine a device identifier for the first device 370 and provide the user interface to the first device 370 to cause the user interface to be generated by a display device (not explicitly illustrated) of the first device 370.

In a similar example, the status alert system 368 can determine a second user profile assigned to a second event 376. For example, the status alert system 368 can analyze the completion status of events 372, 376 associated with the respective workflows, correlate the completion status with role-specific data present in the second user profile, and determine the indication of the first feature state or the second feature state to be provided to a device (e.g., the second device 374) associated with the second user profile based on whether the tasks of the events 372, 376 are completed or delayed. The status alert system 368 can identify delays in tasks that affect events 376 and involve the second user profile. The status alert system 368 can then generate the indication of the first feature state or the second feature state at a user interface at the second device 374. Similar to above, this indication can specify whether the second event 376 assigned to the user corresponding to the second user profile is behind, or affected by another user that is behind, allowing for alerts that inform developers of potential bottlenecks and ensure that progress is consistently monitored and communicated. In some examples, the status alert system 368 can then provide the user interface to the second device 374 to cause the second device 374 to generate the user interface at a display device (not explicitly illustrated) of the second device 374. This user interface can indicate that one or more events 372 associated with the first feature programming workflow are affected by delay attributed to the events 376, along with an indication of the user profiles that are likewise affected by the delay.

In some embodiments, in response to determining a second feature state that indicates one or more events 376 associated with the second device 374 are delayed and correspond to events 372 of the first feature state, the status alert system 368 can analyze the second event 376 to identify one or more aspects to include in an updated indication. In this example, the aspects identified can include dependencies between the events 376 (e.g., that are delayed) and other events 372 (e.g., that are impacted by the delays) within the software programming workflow. In another example, the aspects identified can include outputs of specific components of an application correlated with the completion of the events 376 that are needed to test different components or features of the application correlated with the completion of the events 372. In further examples, the status alert system 368 can update the indication to reflect these aspects and to provide an indication of the dependent events 372 impacted by the delay. This updated indication can then be displayed on a user interface (e.g., of the first device 370 affected by the delay and/or of the second device 374 that is involved in maintaining the delay) to ensure that corresponding users are informed of the delays and their broader implications within the workflow.

In some embodiments, the status alert system 368 can determine user profiles for the developers assigned to the first event 372 and the second event 376 when analyzing workflow dependencies involving the first feature programming workflow and the second feature programming workflow. For example, the status alert system 368 can analyze the tasks of the event 372 and the event 376 to identify which users are responsible for specific tasks in each event and assesses their roles within the software programming workflow. In the examples described, based on this determination, the status alert system 368 can generate an indication of the first feature state to notify the developer involved with the event 376 (the delayed event) that their portion of the second feature programming workflow needs to be completed for the developers working on the event 372 (the impacted event) to proceed. This indication can be included in a user interface that is generated and provided to the second device 374 to indicate to the user correlated with the user profile associated with the second device 374 that the first event and/or the first user correlated with the user profile associated with the first device 370 is delayed due to the status of the second event 376.

In some embodiments, the status alert system 368 can enhance this indication by including specific identifiers for the developers or groups involved in each event. For example, the status alert system 368 can update the indication to display usernames or group identifiers associated with the developers assigned to both events. By providing such detailed information, the status alert system 368 can alert the developers involved in the delayed event (e.g., assigned to the event 376 causing the delay or to the event 372 impacted by the delay) of exactly who is affected by delays and who is responsible for completing dependent tasks.

In further embodiments, the status alert system 368 can determine one or more aspects of the event 372 that are impacted by delays in the event 376 and include a representation of these details into the user interface. For example, the status alert system 368 can identify portions of the first software programming workflow that are affected by incomplete tasks in the second event and visually highlights these areas in the user interface. This visual representation can allow developers responsible for the delays to understand the impacts their tasks have on downstream tasks associated with the event 372, allowing them to prioritize actions to resolve bottlenecks effectively.

In some embodiments, the status alert system 368 can provide the software programming workflow, along with one or more of the first feature state, the second feature state, or the global programming status, to an artificial neural network (ANN) to facilitate dependency analysis. For example, the ANN can process the data described to generate an output indicating one or more dependencies between the first feature workflow and the second feature workflow. In further examples, the ANN can use patterns and relationships within the data to identify how specific events in one workflow are dependent upon events in another workflow. As will be understood, the ANN can be the same as, or similar to, the model 302b of FIG. 3B.

In some embodiments, the status alert system 368 can generate the indication of the first feature state or the second feature state based on the output from the ANN to highlight dependencies between the first feature programming workflow and the second feature programming workflow. For example, the status alert system 368 can generate the indication to specify how a delayed event in the second feature programming workflow affects progress in the first feature programming workflow (e.g., how a delay of the event 376 can cause delay to the event 372). In further examples, this indication can be displayed on a user interface of the first device 370 or the second device 374 to visually represent these dependencies and their impacts on overall workflow execution.

In embodiments, the status alert system 368 can refine the generated indication to emphasize specific dependencies that affect either the first feature programming workflow or the second feature programming workflow. For example, if an incomplete task in one feature programming workflow can block progress in another workflow, the status alert system 368 can update the indication to indicate this dependency and its implications for task completion. In these examples, by integrating outputs from the ANN into the indication of the user interface, the status alert system 368 can improve the ability of users to identify and address dependencies within complex workflows.

In some embodiments, the status alert system 368 can analyze mappings established by the dependencies described to determine one or more actions that can be implemented to mitigate the delays attributable to the event 376 that impact the first feature programming workflow. In some examples, the status alert system 368 can evaluate workflow interdependencies and one or more delays attributed to the event 376 to identify remedial actions such as reprioritizing tasks of the event 376 or the event 372, initiating automated fallback procedures, etc. In some embodiments, the status alert system 368 can then update the indication to include these determined actions so that users can be clearly informed of the mitigation steps available. For example, the status alert system 368 can update the indication with visual cues and actionable checklists that delineate how each action can address the delay attributed to the event 376. In some examples, the updated indication can include specific instructions, such as executing an automated process or alerting the responsible user or team.

In some embodiments, the status alert system 368 can determine one or more data elements associated with the event 376 that are generated during testing or execution of the application and affecting the first feature programming workflow. For example, these data elements can include outputs, configurations, or intermediate results that are involved in the testing or execution of portions of the first feature programming workflow. In an example, in response to determining that these data elements cannot be generated based on the current status of the second feature programming workflow, the status alert system 368 can identify and determine one or more alternative data elements that can substitute for the missing or delayed data elements. These alternative data elements may be derived from pre-established rules, historical data, or dynamically generated substitutes that maintain workflow continuity. The status alert system 368 can then update the indication to incorporate these alternative data elements into the user interface. For example, the updates to the indication can explicitly highlight that the alternative data elements have been substituted in place of the original data elements to mitigate delays and ensure workflow progression. In some examples, the status alert system 368 can update the indication to further indicate how the alternative data elements fulfill dependencies within the first feature programming workflow, limitations associated with the use of the alternative data, etc.

In some embodiments, the status alert system 368 can also determine a first user profile assigned to the first event by analyzing user assignment data and workflow responsibilities indicated by the output of the ANN. For example, the status alert system 368 can determine how to generate an indication of the first feature state or the second feature state based on this user profile and the output generated by the ANN. In examples, generating the indication can be based on the status alert system 368 combining the output of the ANN with user-specific information derived from the first user profile. For example, if a dependency identified by the ANN indicates that progress in the first feature programming workflow is blocked by delays in the second feature programming workflow, the status alert system 368 can update indication to generate notifications at the first device 370 and the second device 374 to notify respective users associated with both workflows of the delays. In further examples, this indication can specify how delays in one feature programing workflow impact tasks assigned to a particular user or group. And in some embodiments, the status alert system 368 can determine whether to generate an indication or forgo generation based on user preferences established by the corresponding user profiles. For example, a user correlated with the user profile of the first device 370 can configure their user profile to indicate their preference to specify conditions under which notifications or indications should be displayed, such as only for critical dependencies or delays that exceed a certain threshold (e.g., that are more than 1 day behind, 2 days behind, etc.). In this context, the status alert system 368 can evaluate these preferences and the current workflow data and dependencies to decide whether generating an indication matches the user preferences.

In some embodiments, the ANN provided with the software programming workflow and feature states by the status alert system 368 can be implemented as various models, such as a transformers-based model. For example, the ANN can include a large language model (LLM), a small language models (SLM), etc.).

When executing the ANN, the status alert system 368 can provide inputs such as the software programming workflow (or portions thereof), the first feature state, the second feature state, or the global programming status to the ANN. The ANN can then process these inputs by converting them into numerical vector representations through an input embedding layer, capturing both semantic and syntactic properties of the inputs. These embeddings are then passed through multiple layers of self-attention mechanisms and feed-forward networks within a component (e.g., an encoder) of the ANN to generate contextualized representations of the input sequence. For example, the input can include details about dependencies involving multiple tasks within the of the first feature programming workflow and the second feature programming workflow and execute a self-attention mechanism to identify relationships and prioritize relevant components of the sequence. In this example, the output of the ANN can include a mapping of dependencies between the first feature programming workflow and the second feature programming workflow, indicating how specific events (e.g., event 376) in one workflow influence progress in the other (e.g., event 372). This output can then be used by the status alert system 368 to update indications displayed at the user interface. For instance, if the ANN identifies an event 376 in the second feature programming workflow as delaying tasks in the first feature workflow, this dependency can be included in a notification or visual representation on a user interface.

In some embodiments, the status alert system 368 can train the ANN using supervised learning techniques that involve labeled datasets representing known dependencies between feature workflows. For example, during training, the status alert system 368 can use backpropagation to iteratively adjust the weights and biases of the ANN (or portions thereof). In this process, the status alert system 368 can calculate the error between the predicted output and the ground truth using a loss function and propagate this error backward through the network layers to compute gradients. These gradients can then used by an optimization algorithm, such as gradient descent, to update the network parameters. This process can continue until convergence is reached, where the loss function stabilizes at a minimum value or range of values, ensuring that the ANN accurately identifies dependencies between workflows. By leveraging backpropagation and iterative optimization, the status alert system 368 can confirm that the ANN is effectively trained to analyze complex dependencies within programming workflows.

It is contemplated that the steps or descriptions of FIG. 3C may be used with any other embodiment of this disclosure. In addition, the steps, operations, and descriptions described in relation to FIG. 3C may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 3C.

Figure 3D:
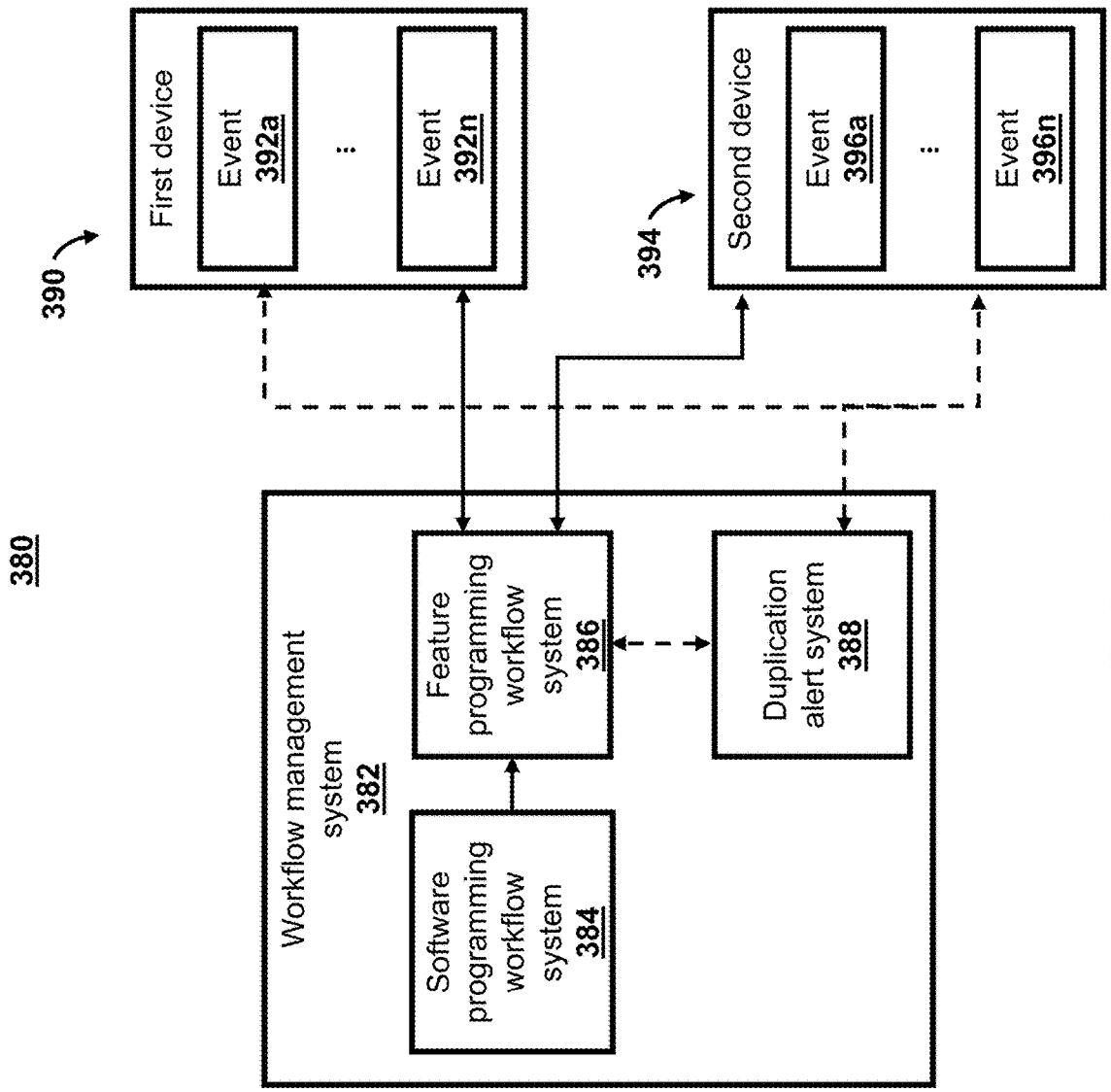
FIG. 3D shows an illustrative diagram of a system architecture 380 for providing centralized communication across feature programming workflows, in accordance with one or more embodiments.

FIG. 3D shows an illustrative diagram of a system architecture 380 for providing centralized communication across feature programming workflows, in accordance with one or more embodiments. For example, the system architecture 380 may be configured to centralize communication across feature programming workflows by providing status indications in response to detection of one or more duplicate operations between a first software workflow and a second software workflow as described herein. In examples described, the software programming workflows may correspond to production of one or more applications. Production of the applications themselves may include numerous phases or parts such as the previously discussed beta phase, planning phase, coding phase, building phase, testing phase (which may include the beta phase), deployment phase, operate phase, and/or monitor phase, as described above.

The system architecture 380 can include a workflow management system 382, a first device 390, and a second device 394, each having, or otherwise being associated with, one or more components as described herein. The workflow management system 382, the first device 390, and the second device 394, including the components thereof, can be configured to interconnect using one or more wired and/or wireless communication connections. As will be understood, the system architecture 380, as illustrated, includes the workflow management system 382, the first device 390, and the second device 394, but similar environments can include more devices that are the same as, or similar to, those described.

The workflow management system 382 can include a computing device that is configured to be in communication with the first device 390 and the second device 394 using one or more communication connections. For example, the workflow management system 382 can include a server, a desktop computer, a laptop computer, a smartphone, a tablet, and/or the like. In some embodiments, the workflow management system 382 can be involved in monitoring one or more software programming workflows that involve one or more of the first device 390 and the second device 394. As described herein, the workflow management system 382 (e.g., one or more components of the workflow management system 382) can establish one or more secured or unsecured communication connections with the first device 390 and the second device 394. The workflow management system 382 can implement a software programming workflow system 384, a feature programming workflow system 386, and/or a duplication alert system 388.

The first device 390 can include a computing device that is configured to be in communication with the workflow management system 382. For example, the first device 390 can include a server, a desktop computer, a laptop computer, a smartphone, a tablet, and or the like. In some embodiments, the first device 390 can be involved in (e.g., can direct) the execution of one or more operations to complete one or more events 392a-392n (referred to individually as an event 392 and collectively as events 392, where contextually appropriate) involved in software programming workflow, such as portions of one or more feature programming workflows. For example, the first device 390 can be operated by an individual such as a software or program developer and can be configured to receive input from the individual during the development life cycle of one or more features of an application. The first device 390 can then execute one or more operations based on this input from the individual to complete one or more events 392 involved in a software programming workflow. These events 392 can be associated with one or more feature programming workflows. As described herein, the first device 390 can establish one or more secured or unsecured communication connections with the workflow management system 382 and/or the second device 394 (not explicitly illustrated).

The second device 394 can include a computing device that is configured to be in communication with the workflow management system 382. For example, the second device 394 can include a server, a desktop computer, a laptop computer, a smartphone, a tablet, and or the like. In some embodiments, the second device 394 can be involved in (e.g., can direct) the execution of one or more operations to complete one or more events 396a-396n (referred to individually as an event 396 and collectively as events 396, where contextually appropriate) involved in a second feature programming workflow. For example, the second device 394 can be operated by an individual such as a software or program developer and can be configured to receive input from the individual during the development life cycle. The second device 394 can then execute one or more operations based on this input from the individual to complete one or more events 396 involved in a software programming workflow. These events 396 can be associated with one or more feature programming workflows. As described herein, the second device 394 can establish one or more secured or unsecured communication connections with the workflow management system 382 and/or the first device 390.

With continued reference to FIG. 3D, the workflow management system 382 can implement and/or execute the software programming workflow system 384. For example, the workflow management system 382 can configure the software programming workflow system 384 to obtain and analyze one or more specifications corresponding to one or more software programming workflows. In some embodiments, each specification can indicate one or more elements of an application (e.g., a user interface module, a database component, or an authentication service) whose development status is represented by one or more events forming portions of a software development lifecycle.

In some embodiments, each software programming workflow can be associated with one or more feature programming workflows for features of one or more application being developed. The software programming workflow system 384 can then execute operations (in coordination with the feature programming workflow system 386) to manage communications between a first device 390 and a second device 394 controlled by developers when developing respective portions of an application. In an example, the software programming workflow system 384 can analyze each software programming workflow (or portions thereof) to determine the events 392, 396 involved in a first software programming workflow and a second software programming workflow, respectively. In this example, the software programming workflow system 384 can also determine whether one or more events 392, 396 from different software programming workflows that are associated with (e.g., correspond to) one another. The software programming workflow system 384 can then track and monitor the status of the events 392 and events 396 associated with a first software programming workflow and the second software programming workflow (respectively) using the feature programming workflow system 386 and/or the duplication alert system 388, where the events represent tasks that are assigned to be completed by the developers using the first device 390 and the second device 394, respectively. While examples described herein involve events 392 (e.g., that are under development or completed) associated with the first device 390 being described as being the same as, or similar to, events 396 (e.g., that are not yet under development, or are under development and not completed) associated with the second device 394, it will be understood that any number of events 392, 396 can be at various stages of development and that the indications included in the user interfaces described herein can indicate to delays attributable to any combination of users controlling the first device 390 or the second device 394. Further, it will be understood that portions of the first software programming workflow and the second software programming can be updated over time and, as they are updated, the duplication alert system 388 can determine whether the updates result in events 392, 396 corresponding to one another and result in overlaps (e.g., in code being developed, etc.).

In some embodiments, to determine the events 392, 396, the software programming workflow system 384 can obtain a first specification for the first software programming workflow and a second specification for the second software programming workflow. The software programming workflow system 384 can then determine a first feature programming workflow and a second feature programming workflow based on the first specification and the second specification, respectively. In this example, the first specification and the second specification can provide a detailed index of parameters for distinct software features such as user interface components (e.g., a web-based user interface or a mobile touch panel, etc.), backend service modules (e.g., a data processing module or an authentication module, etc.), and so on. In some examples, the software programming workflow system 384 can determine a first set of events 392 based on the first software programming workflow and/or the first feature programming workflow, where each event 392 corresponds to specific development milestones like source code commits, unit test initiations, or integration triggers. The software programming workflow system 384 can also determine a second set of events 396 based on the second software programing workflow, where each event 396 corresponds to a separate set of parameters for distinct software features.

In some embodiments, the software programming workflow system 384 can extract the first set of events 392 from the first specification (e.g., based on the first software programming workflow) and the second set of events 396 from the second specification (e.g., based on the second software programming workflow). For example, the software programming workflow system 384 can parse each specification to identify event triggers and definitions that indicate specific development milestones, such as code commits, testing initiations, or deployment notifications that are associated with various portions of the first software programming workflow and the second software programming workflow. The software programming workflow system 384 can then extract the events 392 from the first specification by analyzing descriptive text within the first specification to isolate event indicators that correspond to particular workflow actions. The software programming workflow system 384 can perform similar operations to extract the second set of events 396 from the second specification.

In some embodiments, the software programming workflow system 384 can recursively step through the first specification and the second specification to extract the first set of events 392 established by the first specification and the second set of events 396 established by the second specification, respectively. For example, the software programming workflow system 384 can iteratively process and parse each section of the first specification and the second specification to isolate event triggers that represent development milestones such as code commits, test initiations, or deployment notifications described by the respective documents. In some example, the software programming workflow system 384 can determine the first set of events 392 for the first feature programming workflow and the second set of events 396 for the second feature programming workflow by evaluating one or more dependencies that interconnect the two extracted sets of events, such as temporal, sequential, or logical relationships. For example, these dependencies can involve the initiation of an event 392 from the first specification condition the triggering of a related event 396 from the second specification, thereby allowing the software programming workflow system 384 to determine the progress of each software programming workflow. In at least some examples, recursively extracting the events 392, 396 and assessing their dependencies can allow the software programming workflow system 384 to monitor feature programming workflows throughout the software development process and provide notifications to the first device 390 and the second device 394 as described herein. The software programming workflow system 384 can then provide an indication of the first set of events 392 and the second set of events 396 to the feature programming workflow system 386 to allow the feature programming workflow system 386 to execute one or more operations as described herein.

In some embodiments, the feature programming workflow system 386 can determine that at least one first event 392 of the first software programming workflow corresponds to at least one second event 396 of the second software programming workflow. For example, the feature programming workflow system 386 can determine that one or more event 392 of the first set of events 392 correspond to one or more events 396 of the second set of events 396 by identifying one or more aspects of first event 392 (sometimes referred to as first aspects) and one or more aspects of second event 396 (sometimes referred to as second aspects). In this example, the feature programming workflow system 386 can compare these aspects to determine one or more matches between the events 392, 396. For example, the feature programming workflow system 386 can determine characteristics such as event identifiers, timestamps, and contextual metadata from an event 392 and an event 396 and, upon determining that these characteristics align, determine that the events 392, 396 correspond to each other. In another example, the feature programming workflow system 386 can determine one or more first modules involved in the first software programming workflow have a first set of inputs and outputs that match a second set of inputs and outputs of one or more second modules in the second software programming workflow. In yet another example, the feature programming workflow system 386 can determine a correspondence between the first event 392 and the second event 396 based on the first software programming workflow involving one or more APIs that are the same as, or identical to, those involved in the second software programming workflow. For example, the feature programming workflow system 386 can compare API call signatures, data exchange formats, and authentication parameters extracted from each event 392, 396, and upon confirming that these API configurations match, the feature programming workflow system 386 can determine that first event 392 corresponds to second event 396.

In some embodiments, the feature programming workflow system 386 can determine that one or more portions of the first software programming workflow and the second software programming workflow overlap based on the first event 392 corresponding to the second event 396 by analyzing aspects associated with each event 392, 396 and their respective modules. For example, the feature programming workflow system 386 can extract one or more characteristics such as input and output sets, API call signatures, timestamps, and contextual metadata from first event 392 and compares these with corresponding characteristics from second event 396. In some examples, the feature programming workflow system 386 can determine that overlapping workflow portions exist when the identified characteristics, including identical API usage patterns and matching interfaces of associated modules, align between the two events 392, 396. In some examples, the feature programming workflow system 386 can confirm that these aspects match to allow the feature programming workflow system 386 to establish that specific segments or stages of the first software programming workflow and the second software programming workflow are the same, or similar, to one another.

In some embodiments, the feature programming workflow system 386 can communicate with the duplication alert system 388 to cause a display device to generate a status indication at the first device 390 and/or the second device 394 to indicate overlapping portions of the first software programming workflow and the second software programming workflow. For example, the feature programming workflow system 386 can determine that the first event 392 corresponds to the second event 396 and that one or more portions of the corresponding software programming workflows overlap. The feature programming workflow system 386 can then transmit instructions to the duplication alert system 388 to cause the display device of the first device 390 and/or the second device 394 to visually represent this overlap. In some examples, the status indication can include graphical elements such as color-coded progress bars, icons, or text annotations that indicates shared modules, APIs, or input-output relationships between the workflows. For example, if overlapping portions involve shared API calls or synchronized task dependencies, the duplication alert system 388 can cause the display of these details to provide actionable insights for users monitoring workflow execution.

In some embodiments, the duplication alert system 388 can cause the display device of the first device 390 to indicate the overlapping portions of the first software programming workflow and the second software programming workflow. For example, the duplication alert system 388 can cause the display device of the first device 390 to indicate that one or more portions of the first software programming workflow completed by that user (or in progress) are associated with one or more portions of the second software programming workflow that are going to be completed (or are in progress) by a different user (e.g., the user controlling the second device 394). This can alert the user associated with the first device 390 that one or more users associated with one or more other devices such as the second device 394 may be about to generate duplicate code that the user being alerted has already developed. In some examples, the indication can further indicate that the user about to generate the duplicate code does not have access, or is not permitted to access, portions of a repository in the control of the first user. In this example, the indication can include a request for access to code corresponding to the overlapping portions of the first software programming workflow. For example, the duplication alert system 388 can include a hypertext link that, once selected based on input provided by the user at the first device 390, causes the first device 390 to execute one or more operations that configure a web browser to navigate to a code repository. In some examples, the link can automatically update the access permissions associated with the code in that code repository overlapping with the code that is in progress or about to be developed by the other user.

In some embodiments, the duplication alert system 388 can cause a display device to generate a status indication at a second device 394 operated by a user who does not have access to the overlapping portions of the first software programming workflow. For example, the duplication alert system 388 can transmit instructions to the display device associated with the second device 394 to generate a status indication based on determining that the first event 392 corresponds to second event 396 and that one or more portions of the workflows overlap. In some examples, this status indication can include visual markers, progress indicators, etc., that signify the existence of overlapping workflow portions. In some examples, the duplication alert system 388 can provide a hyperlink to the second device 394 to cause the second device 394 to execute one or more operations to configure a web browser and navigate to a code repository associated with the overlapping portions of the first software programming workflow. This hypertext link can cause the second device 394 to execute one or more operations to configure a web browser to navigate to the code repository. In some examples, the second device 394 can also be triggered to execute one or more scripts and a webhook endpoint. This can configure one or more commands to be executed to update a local code base associated with the second device 394 based on one or more changes made at the code repository.

In some embodiments, the duplication alert system 388 can be configured to cause a display device to generate a status indication of one or more aspects of first event 392 or second event 396 based on the first state of the first software programming workflow or the second state of the second software programming workflow satisfying a completion threshold (e.g., an indication of whether a portion of a software programming workflow was started, and to what degree development of the software programming workflow (or portion thereof) has been completed). For example, the duplication alert system 388 can monitor whether a user associated with a first device 390 has completed a threshold amount of code that a user associated with a second device 394 is about to, or is in the process of, completing. In some examples, upon detecting that the completion threshold is satisfied, the duplication alert system 388 can transmit instructions to the display device of the first device 390 and/or the second device 394 to generate a status indication highlighting relevant aspects of first event 392 or second event 396, such as associated modules, input-output relationships, or API calls. For instance, this status indication can include visual elements like progress bars or alerts that notify users of overlapping efforts, thereby enabling proactive coordination and reducing redundant work across devices. In other examples, the indication can identify portions of code in a repository that has access permissions preventing one or more users from viewing the code, as described above.

It is contemplated that the steps or descriptions of FIG. 3D may be used with any other embodiment of this disclosure. In addition, the steps, operations, and descriptions described in relation to FIG. 3D may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 3D.

In some examples, a feature programming workflow system can be adapted to manage financial workflows such as loan processing, payment reconciliation, or investment portfolio management by automating repetitive tasks and confirming compliance with regulatory requirements. In some examples, the one or more of the devices of FIG. 3D can identify overlapping portions of workflows involving different financial services such as shared APIs for payment gateways or data inputs for credit scoring. In these examples, the devices can cooperate to generate status indications to notify users of dependencies or progress across interconnected processes. that can result in the execution of redundant operations by the first device 390 or the second device 394 in financial workflows. For example, the workflow management system 382 can analyze completion thresholds for tasks such as document submission or transaction approvals and alert users when overlapping activities are detected between different devices or teams. By generating real-time status indications at the first device 390 or the second device 394, the workflow management system 382 can help users avoid duplication of work while ensuring efficient collaboration across departments.

FIG. 4 shows a flowchart of the steps involved in providing centralized communication across feature programming workflows, in accordance with one or more embodiments. For example, the system may use process 400 (e.g., as implemented on one or more system components described above) in order to provide centralized communication across feature programming workflows using software development lifecycle tools that dynamically determine temporal alerts.

At step 402, process 400 (e.g., using one or more components described above) determines a software programming workflow. For example, the system may determine a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application.

At step 404, process 400 (e.g., using one or more components described above) determines a first feature programming workflow. For example, the system may determine a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application.

At step 406, process 400 (e.g., using one or more components described above) determines a location of a first event for the first feature programming workflow. For example, the system may determine a first location, in the application timeline, of the first event based on a current status of the software programming workflow. In some embodiments, the system may determine the current status using an artificial intelligence model. For example, the system may receive an output of an artificial intelligence model, wherein the artificial intelligence model has been trained on historic compliance data for historic event data. The system may determine the current status based on the output.

In some embodiments, the system may dynamically determine when a given feature will be available based on whether production timelines corresponding to one or more other features are met. For example, the system may continually and/or on a predetermined schedule determine whether or not the current status of a given feature is in compliance. For example, determining the first location, in the application timeline, of the first event based on the current status of the software programming workflow may comprise the system determining a current date, determining a predicted status of one of the plurality of features at the current date, determining an actual status of one of the plurality of features at the current date, and comparing the predicted status to the actual status to determine the current status.

In some embodiments, the system may dynamically determine when a given feature will be available based on whether production timelines corresponding to one or more other features are met. For example, the system may continually and/or on a predetermined schedule determine whether one or more timelines for one or more features is in compliance. For example, determining the first location, in the application timeline, of the first event based on the current status of the software programming workflow may comprise the system determining a number of events corresponding to the plurality of features that are in compliance with an initial application timeline for software programming workflow and determining the current status based on the number of events.

In some embodiments, the system may dynamically determine when a given feature will be available based on whether production timelines corresponding to one or more other features are met. For example, the system may determine a frequency at which events are in compliance with an initial application timeline for software programming workflow. For example, determining the first location, in the application timeline, of the first event based on the current status of the software programming workflow may comprise the system determining a frequency at which events corresponding to the plurality of features are in compliance with an initial application timeline for software programming workflow and determining the current status based on the frequency.

In some embodiments, the system may dynamically determine when a given feature will be available based on whether production timelines corresponding to one or more other features are met. For example, the system may determine an average delay at which features previously made available to the application were made available to the application. For example, determining the first location, in the application timeline, of the first event based on the current status of the software programming workflow may comprise the system determining an average delay for previous events on the application timeline and determining the current status based on the average delay.

In some embodiments, the system may determine the location of an event using an artificial intelligence model. For example, the system may receive an output of an artificial intelligence model, wherein the artificial intelligence model has been trained on historic compliance data for historic event data. The system may determine the first location based on the output.

At step 408, process 400 (e.g., using one or more components described above) retrieves a threshold proximity. For example, the system may retrieve a threshold proximity for generating alerts for a second feature programming workflow.

In some embodiments, the threshold proximity may be different for each feature application workflow. For example, the system may select a threshold proximity based on a lead time required by a given feature application workflow for changes to its timeline. For example, the lead time may depend on a current status (or stage in development) for the feature programming workflow. For example, retrieving the threshold proximity for generating alerts for a second feature programming workflow may comprise the system determining a current status of the second feature programming workflow and determining the threshold proximity based on the current status of the second feature programming workflow.

In some embodiments, the threshold proximity may be different for each feature application workflow and/or based on the status of other feature application workflows. For example, the system may select a threshold proximity based on whether another feature application is delayed or will be released ahead of schedule (e.g., non-compliance with a current timeline). For example, sudden changes in scheduling may increase the urgency at which a feature may need to be completed and/or may introduce additional delays into the development cycle. As such, the system may modify the length of the threshold proximity to capture events resulting from non-compliance with a current timeline. For example, retrieving the threshold proximity for generating alerts for a second feature programming workflow may comprise the system determining an initial location of the first event in an initial application timeline for software programming workflow, determining a difference in the initial location and the first location, and determining the threshold proximity based on the difference.

In some embodiments, the system may determine which feature programming workflows (or users corresponding to the feature programming workflows) for which alerts should be generated. For example, the system may determine different workflows that correspond to the same users. The system may then generate alerts to those users. For example, retrieving the threshold proximity for generating alerts for the second feature programming workflow may comprise the system determining a first user corresponding to both the first feature programming workflow and the second feature programming workflow and determining to retrieve the threshold proximity based on the first user corresponding to both the first feature programming workflow and the second feature programming workflow.

In some embodiments, the system may determine which feature programming workflows (or users corresponding to the feature programming workflows) for which alerts should be generated. For example, the system may determine to only generate alerts for feature programming workflows that are related and/or otherwise contextually relevant. To determine whether two feature programming workflows are related, the system may determine whether a number of dependencies (e.g., shared data input/outputs, shared functions, dependent functions, etc.) exist. For example, the system may determine a number of dependencies between the first feature programming workflow and the second feature programming workflow. The system may compare the number of dependencies to a threshold number of dependencies to determine whether to retrieve the threshold proximity.

In some embodiments, the system may determine a threshold proximity based on the user input. For example, the system may receive a user input. The system may then determine the threshold proximity based on the user input. In some embodiments, the system may retrieve a plurality of threshold proximities for one or more features. For example, the system may retrieve an additional threshold proximity for generating alerts for a third feature programming workflow. The system may determine a third event of the plurality of events that is within the additional threshold proximity on the application timeline, wherein the third feature programming workflow corresponds to production of a third feature of the plurality of features, wherein the third feature programming workflow comprises a third timeline that ends at the third event of the plurality of events on the application timeline, and wherein the third event indicates that the third feature is available for use by the application. The system may generate for display, in the user interface of the software development lifecycle tool for the second feature, an additional alert based on the first location.

At step 410, process 400 (e.g., using one or more components described above) determines a second event based on the threshold proximity. For example, the system may determine a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application.

At step 412, process 400 (e.g., using one or more components described above) generates an alert for the second feature programming workflow. For example, the system may generate for display, in a user interface of a software development lifecycle tool for the second feature, an alert based on the first location.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
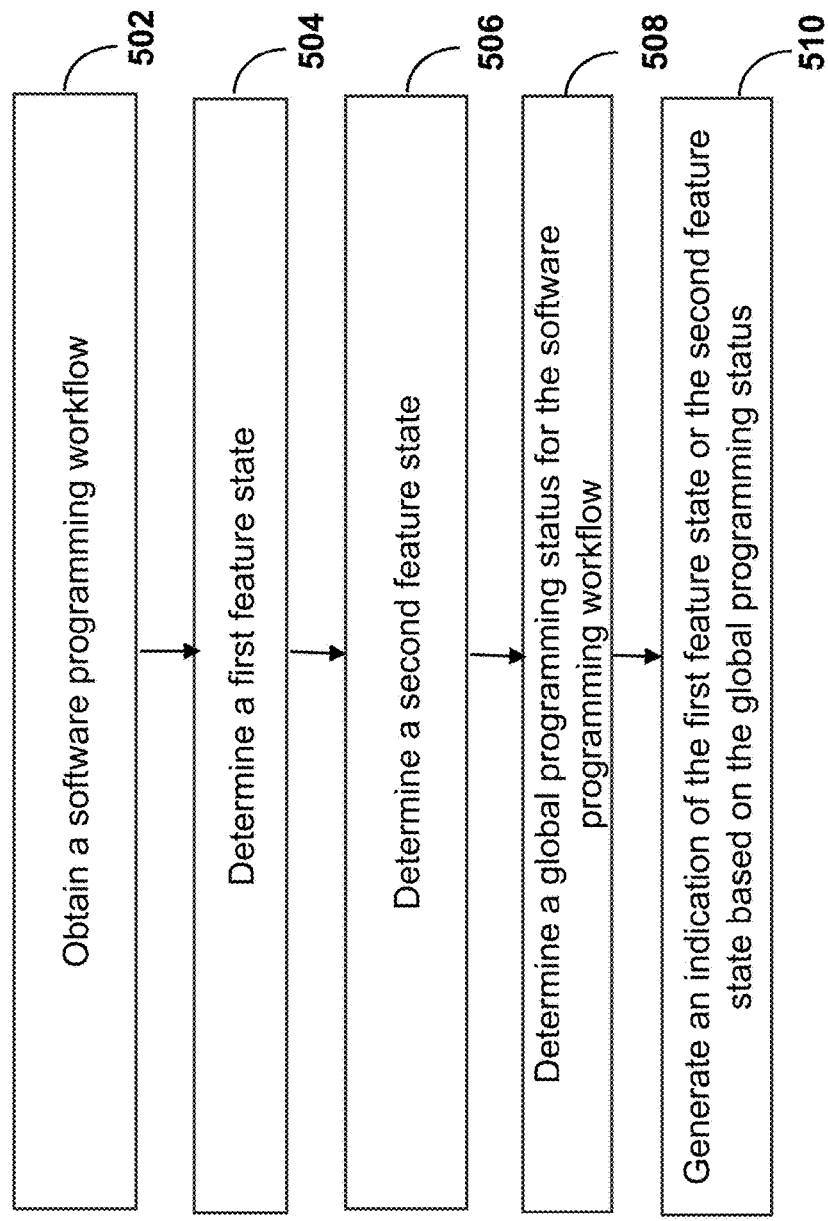
FIG. 5 shows a flowchart of the steps involved in providing centralized communication across feature programming workflows, in accordance with one or more embodiments.

FIG. 5 shows a flowchart of the steps involved in a process 500 for providing centralized communication across feature programming workflows, in accordance with one or more embodiments. For example, the process 500 (e.g., as implemented by one or more system components described above) in order to provide centralized communication across feature programming workflows and, in some cases, provide centralized communication across feature programming workflows by providing status indications dependent on operations executed in accordance with a software programming workflow.

At step 502, process 500 (e.g., using a system of one or more components as described above) includes obtaining a software programming workflow. For example, a system can determine a software programming workflow corresponding to production of an application having a plurality of features. The software programming workflow can include an application timeline including a plurality of events, where each event of the plurality of events indicates when a respective feature of the plurality of features is available for use by the application. In some embodiments, the system can determine a first feature programming workflow and a second feature programming workflow, where the first feature programming workflow corresponds to production of a first feature of the plurality of features. The first feature programming workflow can include a first timeline that ends at a first event of the plurality of events on the application timeline. Completion of the first event can indicate that the first feature is available for use by the application. The system can similarly determine a second feature programming workflow that can include a second timeline that ends at a second event of the plurality of events on the application timeline.

At step 504, process 500 (e.g., using a system of one or more components as described above) includes determining a first feature state for the first feature programming workflow indicating a first status of a first event of the first feature programming workflow. For example, the system can determine the first feature state for the first feature programming workflow. The first feature state can indicate whether one or more events are completed or not completed. In some examples, the first feature programming workflow can include the first event which is associated with one or more tasks that are to be completed during the completion of the first feature. In an example, this first event can be identified as completed and can be pending review such as reviewed during testing. In this example, the testing can involve the use of outputs of a different feature, such as a second feature described herein, and may be affected by the second event not being completed.

At step 506, process 500 (e.g., using a system of one or more components as described above) includes determining a second feature state for the second feature programming workflow indicating a second status of a second event of the second feature programming workflow. For example, the system can determine the second feature state for the second feature programming workflow where the second feature state indicates one or more events are completed or not completed. In some examples, the second feature programming workflow can include the second event which is associated with one or more tasks that are to be completed during the completion of the second feature. As an example, the second event can be identified as not completed and can be further identified as affecting one or more tasks associated with the first event of the first feature programming workflow. This can be because, for example, while the first feature may be complete, the first feature may still need to be tested using one or more outputs associated with the second feature are involved in tasks involving the testing of the first feature. As a result, the first feature programming workflow can be delayed based on the non completion of the second event.

At step 508, process 500 (e.g., using a system of one or more components as described above) includes determining a global program status for the software programming workflow. For example, the system can determine a global programming status for the software programming workflow. In some examples, the system can determine the global programming status based on the 1st status of the 1st event of the first feature programming workflow, the second status of the second feature event of the second feature programming workflow, and one or more of the dependencies between the first feature programming workflow and the second feature programming workflow that involve the first event and the second event, respectively.

At step 510, process 500 (e.g., using a system of one or more components as described above) includes generating an indication of the first feature state or the second feature state based on the global programming status. For example, the system can generate the indication of the first feature state or the second feature state to indicate one or more events that are in progress, delayed, impacted based on delays from other events, etc. The system can then cause a display of a device associated with users developing either the first feature or the second feature to display the indication.

In some examples, this indication can be filtered based on a user profile set by that particular user. For example, where a first user associated with the first feature is not concerned about delays attributable to events from the second feature that may be able to cause delay during testing (for example, because the first user has executed one or more actions to mitigate the delays such as by configuring alternative data elements that can be used during the testing process), the first user can provide input to the system that indicates that the first user should forgo providing the indication.

It is contemplated that the steps or descriptions of FIG. 5 may be used with any other embodiment of this disclosure. In addition, the steps, operations, and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
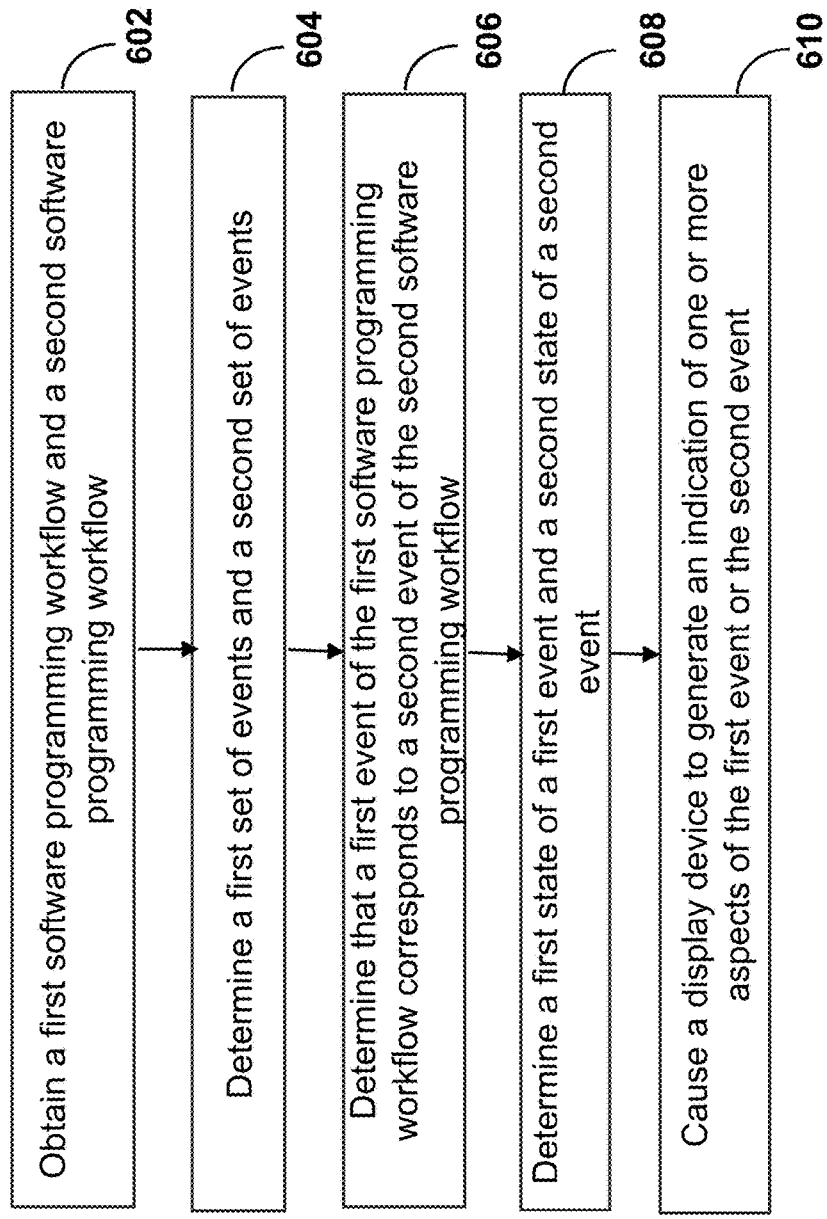
FIG. 6 shows a flowchart of the steps involved in a process for providing status indications in response to detection of one or more duplicate operations between a first software workflow and a second software workflow, in accordance with one or more embodiments.

FIG. 6 shows a flowchart of the steps involved in a process 600 for providing status indications in response to detection of one or more duplicate operations between a first software workflow and a second software workflow, in accordance with one or more embodiments. For example, the process 600 (e.g., as implemented by one or more system components described above) in order to provide centralized communication across feature programming workflows and, in some cases, providing status indications in response to detection of one or more duplicate operations between a first software workflow and a second software workflow.

At step 602, process 600 (e.g., using a system of one or more components as described above) includes obtaining a software programming workflow. For example, a workflow management system that is the same as, or similar to, the workflow management system 362 of FIG. 3C, can obtain a first software programming workflow and a second software programming workflow. In this example, the first software programming workflow can include a plurality of events, and the second software programming workflow can similarly include a plurality of events that are at least in part different from the plurality of events of the first software programming workflow.

At step 604, process 600 (e.g., using a system of one or more components as described above) includes obtaining a software programming workflow. For example, the workflow management system can obtain a first specification and a second specification that are each used to extract the first set of events and the second set of events corresponding to the first software programming workflow and the second software programming workflow, respectively. In some examples, to determine the plurality of events, the workflow management system can recursively step through each of the specifications to determine one or more of the events as they occur in order.

In some environments, each event can be associated with various aspects of a software programming workflow. For example, each event can be associated with aspects of a software programming workflow such as one or more portions of code to be completed in a code base. In some examples, one or more of the aspects from the first event and the second event can be the same as, or similar to, one another and result in portions of code that are configured to receive the same inputs and generate the same outputs. As a result, as developers develop code and contribute to a code base, the developers can duplicate the efforts of one another which can be waste computing resources that are involved in the generation and testing of the separate segments of code.

At step 606, process 600 (e.g., using a system of one or more components as described above) includes determining that a first event of the first software programming workflow corresponds to a second event of the second software programming workflow. For example, a feature programming workflow system 386 can analyze portions of the first software programming workflow and the second software programming workflow to determine that the portions match. In one example, the portions can correspond to modules that have outputs that are the same as, or similar to, one another. These modules can correspond to aspects that the system can use when comparing the first software programming workflow to the second software programming workflow.

At step 608, process 600 (e.g., using a system of one or more components as described above) includes determining a first state of a first event and a second state of the second event. For example, the future programming workflow system can determine a first state of a first event involved in a first program and workflow and a second state of a second event involved in a second programming workflow. The first state can indicate whether one or more modules have been programmed to receive inputs and generate outputs in accordance with the first specification. The second state can indicate whether one or more modules have been programmed to receive inputs and generate outputs in accordance with the second specification. In examples, each of the states can include an indication of whether development of corresponding modules has commenced, and to what degree development has progressed for each of the modules. In some examples, a first state can indicate that code corresponding to a portion of the first software programming workflow is complete or is in progress, and a second state can indicate that code corresponding to a portion of the second software programming workflow is progress or was not started.

At step 610, process 600 (e.g., using a system of one or more components as described above) includes causing a display device to generate an indication of one or more aspects of the first event or the second event. For example, the first event can be associated with one or more portions of the first software programming workflow that were completed, and the second event can be associated with one or more portions of the second software programming workflow that are in progress or have not yet been started. In this example, the system can determine that the completed portions of the first software programming workflow correspond to the in progress (or not yet started) portions of the second software programming workflow. In this example, the system can cause a device such as a first device associated with a user that has completed the portions of the first software programming workflow, to generate a user interface at that first device to indicate that a user associated with the second device that is about to start working on corresponding portions of the second software program workflow has not yet started. In some examples this user interface can also indicate that the user associated with the second device does not have access to the code generated by the user controlling the first device and can suggest that the user controlling the second device be given access to that code. Conversely, the system can cause a device, such as the second device associated with the user that has not completed or has not yet started the portions of the code corresponding to the second software programming workflow, to generate a user interface at that second device to indicate that code was completed by the user controlling the first device that matches the code in development. This can allow the user to control the second device to either request access to the code or to be directed to the code that has already been completed to allow the user to analyze and/or copy that code into their portions of the code base.

It is contemplated that the steps or descriptions of FIG. 6 may be used with any other embodiment of this disclosure. In addition, the steps, operations, and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

An Application-Specific Integrated Circuit (ASIC) is a specialized hardware chip designed to perform a specific task or set of tasks with high efficiency. Unlike general-purpose processors, such as CPUs or GPUs, ASICs are custom-built for particular applications, optimizing performance, power consumption, and area efficiency. ASICs are widely used in areas such as cryptocurrency mining, telecommunications, and artificial intelligence (AI), where dedicated hardware can provide significant advantages over more flexible but less efficient alternatives. Implementing a large AI model in an ASIC requires designing custom circuits that accelerate the model's computations while ensuring efficient memory management and data movement. Because AI models, particularly deep learning networks, involve extensive matrix multiplications and tensor operations, specialized hardware units such as systolic arrays or tensor processing units (TPUs) can be integrated to optimize these operations. To overcome this challenge, the system may use weight quantization, memory hierarchy optimization, and on-chip interconnects can be employed to improve throughput and reduce power consumption. To accommodate large models, the system may integrate high-bandwidth memory (HBM) or leverage chiplet architectures, where multiple ASICs work together in a modular fashion to process different portions of the model. Training AI models on an ASIC presents significant challenges since training involves dynamic weight updates and high computational flexibility, which contrasts with the fixed nature of ASICs. To do so, the system may use field-programmable gate arrays (FPGAs) or GPUs during the training phase, then transfer the trained model weights to the ASIC for inference. Alternatively, the system may design ASICs that support on-chip fine-tuning or low-bit precision training, allowing for limited retraining directly on the device. Additionally, co-designing hardware and algorithms ensures that the model architecture is tailored to the ASIC's capabilities, reducing inefficiencies and maximizing performance. By integrating specialized training accelerators, approximate computing methods, and efficient dataflow architectures, ASICs can be optimized for both training and inference, enabling large AI models to operate with minimal energy and latency constraints.

The present techniques will be better understood with reference to the following enumerated embodiments:

1. A method for providing centralized communication across feature programming workflows using software development lifecycle tools that dynamically determine temporal alerts, providing status indications dependent on operations executed in accordance with a software programming workflow based on satisfaction of dependencies across feature programming workflows of the software programming workflow, and/or providing status indications in response to detection of one or more duplicate operations between a first software workflow and a second software workflow.
2. The method of any one of the preceding embodiments, further comprising: determining a software programming workflow, wherein the software programming workflow corresponds to production of an application comprising a plurality of features, wherein the software programming workflow comprises an application timeline comprising a plurality of events, wherein each event of the plurality of events indicates when a respective feature of the plurality of features is available for use by the application; determining a first feature programming workflow, wherein the first feature programming workflow corresponds to production of a first feature of the plurality of features, wherein the first feature programming workflow comprises a first timeline that ends at a first event of the plurality of events on the application timeline, and wherein the first event indicates that the first feature is available for use by the application; determining a first location, in the application timeline, of the first event based on a current status of the software programming workflow; retrieving a threshold proximity for generating alerts for a second feature programming workflow; determining a second event of the plurality of events that is within the threshold proximity on the application timeline, wherein the second feature programming workflow corresponds to production of a second feature of the plurality of features, wherein the second feature programming workflow comprises a second timeline that ends at the second event of the plurality of events on the application timeline, and wherein the second event indicates that the second feature is available for use by the application; and generating for display, in a user interface of a software development lifecycle tool for the second feature, an alert based on the first location.

3. The method of any one of the preceding embodiments, wherein retrieving the threshold proximity for generating alerts for a second feature programming workflow further comprises: determining a current status of the second feature programming workflow; and determining the threshold proximity based on the current status of the second feature programming workflow.

4. The method of any one of the preceding embodiments, wherein retrieving the threshold proximity for generating alerts for a second feature programming workflow further comprises: determining an initial location of the first event in an initial application timeline for software programming workflow; determining a difference in the initial location and the first location; and determining the threshold proximity based on the difference.

5. The method of any one of the preceding embodiments, wherein retrieving the threshold proximity for generating alerts for the second feature programming workflow further comprises: determining a first user corresponding to both the first feature programming workflow and the second feature programming workflow; and determining to retrieve the threshold proximity based on the first user corresponding to both the first feature programming workflow and the second feature programming workflow.

6. The method of any one of the preceding embodiments, wherein determining the first location, in the application timeline, of the first event based on the current status of the software programming workflow further comprises: determining a current date; determining a predicted status of one of the plurality of features at the current date; determining an actual status of the one of the plurality of features at the current date; and comparing the predicted status to the actual status to determine the current status.

7. The method of any one of the preceding embodiments, wherein determining the first location, in the application timeline, of the first event based on the current status of the software programming workflow further comprises: determining a number of events corresponding to the plurality of features that are in compliance with an initial application timeline for software programming workflow; and determining the current status based on the number of events.

8. The method of any one of the preceding embodiments, wherein determining the first location, in the application timeline, of the first event based on the current status of the software programming workflow further comprises: determining a frequency at which events corresponding to the plurality of features are in compliance with an initial application timeline for software programming workflow; and determining the current status based on the frequency.

9. The method of any one of the preceding embodiments, wherein determining the first location, in the application timeline, of the first event based on the current status of the software programming workflow further comprises: determining an average delay for previous events on the application timeline; and determining the current status based on the average delay.

10. The method of any one of the preceding embodiments, further comprising: determining a number of dependencies between the first feature programming workflow and the second feature programming workflow; and comparing the number of dependencies to a threshold number of dependencies to determine whether to retrieve the threshold proximity.

11. The method of any one of the preceding embodiments, further comprising: receiving a user input; and determining the threshold proximity based on the user input.

12. The method of any one of the preceding embodiments, further comprising: retrieving an additional threshold proximity for generating alerts for a third feature programming workflow; determining a third event of the plurality of events that is within the additional threshold proximity on the application timeline, wherein the third feature programming workflow corresponds to production of a third feature of the plurality of features, wherein the third feature programming workflow comprises a third timeline that ends at the third event of the plurality of events on the application timeline, and wherein the third event indicates that the third feature is available for use by the application; and generating for display, in the user interface of the software development lifecycle tool for the second feature, an additional alert based on the first location.

13. The method of any one of the preceding embodiments, further comprising: receiving an output of an artificial intelligence model, wherein the artificial intelligence model has been trained on historic compliance data for historic event data; and determining the first location based on the output.

14. The method of any one of the preceding embodiments, further comprising: receiving an output of an artificial intelligence model, wherein the artificial intelligence model has been trained on historic compliance data for historic event data; and determining the current status based on the output.

15. A method of any one of the preceding embodiments, comprising: obtaining a software programming workflow that is associated with a first feature programming workflow and a second feature programming workflow for an application, the software programming workflow comprising a plurality of events corresponding to one or more features implemented by the application; determining a first feature state for the first feature programming workflow indicating a first status of a first event of the first feature programming workflow, the first event being completed; determining a second feature state for the second feature programming workflow indicating a second status of a second event of the second feature programming workflow, the second event being not completed; determining a global programming status for the software programming workflow based on the first status, the second status, and one or more dependencies between the first feature programming workflow and the second feature programming workflow that involve the first event or the second event; and generating, for display on a user interface, an indication of the first feature state or the second feature state based on the global programming status.

16. The method of any one of the preceding embodiments, further comprising: determining a first user profile assigned to the first event; and determine the indication of the first feature state or the second feature state based on the first user profile, wherein generating the indication of the first feature state or the second feature state comprises: generating the indication of the first feature state or the second feature state based on the first user profile to indicate an impact involving the first feature state.

17. The method of any one of the preceding embodiments, wherein generating the indication of the first feature state or the second feature state based on the first user profile comprises: determining a first device identifier for a first device associated with the first user profile; wherein generating, for display on the user interface, the indication of the first feature state or the second feature state comprises: generating the user interface to include an indication of the first feature state or the second feature state at a display device of the first device.

18. The method of any one of the preceding embodiments, wherein generating the indication of the first feature state or the second feature state comprises: determining a second user identifier for a second user profile associated with the second event; and updating the user interface to comprise the second user identifier for the second user profile.

19. The method of any one of the preceding embodiments, further comprising: determining a second user profile assigned to the second event; and determining the indication of the first feature state or the second feature state based on the second user profile, wherein generating the indication of the first feature state or the second feature state comprises: generating the indication of the first feature state or the second feature state based on the second user profile to indicate an impact involving the first feature state that is associated with a status of the second event.

20. The method of any one of the preceding embodiments, further comprising: in response to determining the second feature state, determining one or more aspects of the second event to include in the indication; and updating the indication to include the one or more aspects of the second event.

21. The method of any one of the preceding embodiments, wherein determining the one or more aspects of the second event comprises: determining one or more dependencies associated with the second event, the one or more dependencies indicating the first event, wherein updating the indication to include the one or more aspects comprises: updating the indication to indicate that at least the first event is dependent on completion of the second event.

22. The method of any one of the preceding embodiments, wherein determining the one or more aspects of the second event comprises: determining one or more data elements associated with the second event that are generated during execution of the application, wherein updating the indication to include the one or more aspects comprises: updating the indication to indicate that at least the first event is dependent on completion of the second event.

23. The method of any one of the preceding embodiments, further comprising: determining a second user profile assigned to the second event; and determine the indication of the first feature state or the second feature state based on a first user profile assigned to the first event, wherein generating the indication of the first feature state or the second feature state comprises: generating the indication of the first feature state or the second feature state based on the second user profile to indicate an impact caused by the second feature state.

24. The method of any one of the preceding embodiments, wherein generating the indication of the first feature state or the second feature state comprise: determining the first user profile involved in the first status of the first event of the first feature programming workflow, wherein generating the indication of the first feature state or the second feature state comprises: generating the indication based on the first user profile to indicate a first user that is impacted based on the second feature state.

25. The method of any one of the preceding embodiments, further comprising: in response to determining the second feature state, determining one or more aspects of the first event to include in the indication; and updating the indication to include the one or more aspects of the first event.

26. The method of any one of the preceding embodiments, further comprising: providing the software programming workflow and one or more of the first feature state, the second feature state, or the global programming status to an artificial neural network (ANN) to cause the ANN to generate an output indicating one or more dependencies between the first feature programming workflow and the second feature programming workflow, wherein generating the indication comprises: generating the indication to indicate the one or more dependencies between the first feature programming workflow and the second feature programming workflow that affect the first feature programming workflow or the second feature programming workflow.

27. The method of any one of the preceding embodiments, further comprising: determining one or more actions that can be implemented to mitigate delays associated with the second feature programming workflow that affect the first feature programming workflow; and updating the indication to indicate the one or more actions.

28. The method of any one of the preceding embodiments, wherein determining the one or more actions comprises: determining one or more data elements associated with the second event that are generated during execution of the application; and in response to determining that the one or more data elements cannot be generated based on the second feature state, determining one or more alternative data elements, wherein updating the indication to indicate the one or more actions comprises: updating the indication to indicate that the one or more alternative data elements can be substituted for the one or more data elements.

29. The method of any one of the preceding embodiments, further comprising: providing the software programming workflow and one or more of the first feature state, the second feature state, or the global programming status to an artificial neural network (ANN) to cause the ANN to generate an output indicating one or more dependencies between the first feature programming workflow and the second feature programming workflow; determining a first user profile assigned to the first event; and determine the indication of the first feature state or the second feature state based on the first user profile and the output indicating the one or more dependencies.

30. The method of any one of the preceding embodiments, comprising: obtaining a first software programming workflow comprising a first plurality of events and a second software programming workflow comprising a second plurality of events; determining a first set of events for the first software programming workflow and a second set of events for the second software programming workflow; determining that a first event of the first software programming workflow corresponds to a second event of the second software programming workflow; in response to determining that the first event corresponds to the second event, determining a first state of the first event and a second state of the second event; and causing a display device to generate a status indication of one or more aspects of the first event or the second event based on the first state or the second state satisfying a completion threshold.

31. The method of any one of the preceding embodiments, further comprising: obtaining a first specification for a first feature programming workflow and a second specification for a second feature programming workflow, wherein determining the first set of events and the second set of events comprises: determining the first set of events based on the first specification, and the second set of events based on the second specification.

32. The method of any one of the preceding embodiments, wherein determining the first set of events and the second set of events comprises: extracting the first set of events from the first specification and the second set of events from the second specification.

33. The method of any one of the preceding embodiments, wherein extracting the first set of events from the first specification and the second set of events from the second specification comprises: recursively stepping through the first specification and the second specification to identify the first set of events established by the first specification and the second set of events established by the second specification; and determining the first set of events for the first feature programming workflow and the second set of events for the second feature programming workflow based on one or more dependencies involving the first set of events and the second set of events.

34. The method of any one of the preceding embodiments, wherein determining that the first event corresponds to the second event comprises: determining one or more first aspects of the first event and one or more second aspects the second event; comparing the one or more first aspects to the one or more second aspects; and in response to determining the one or more first aspects match the one or more second aspects, determining that the first event corresponds to the second event.

35. The method of any one of the preceding embodiments, wherein determining the one or more first aspects of the first event and the one or more second aspects the second event comprises: determining one or more first modules involving the first software programming workflow are associated with a first set of inputs and outputs, and determining one or more second modules involving the second software programming workflow are associated with a second set of inputs and outputs, wherein determining the one or more first aspects match the one or more second aspects comprises: determining the first set of inputs and outputs matches the second set of inputs and outputs.

36. The method of any one of the preceding embodiments, wherein determining the one or more first aspects of the first event and the one or more second aspects the second event comprises: determining one or more application programming interfaces (APIs) of the first software programming workflow and one or more APIs of the second software programming workflow, wherein determining the one or more first aspects match the one or more second aspects comprises: determining the one or more APIs of the first software programming workflow matches the one or more APIs of the second software programming workflow.

37. The method of any one of the preceding embodiments, further comprising: determining one or more portions of the first software programming workflow and the second software programming workflow overlap based on the first event corresponding to the second event, wherein causing the display device to generate the status indication of the one or more aspects of the first event or the second event based on the first state or the second state satisfying the completion threshold comprises: causing the display device to generate the status indication at a device involved in executing the one or more portions of the first software programming workflow or the second software programming workflow to indicate the one or more portions of the first software programming workflow and the second software programming workflow that overlap.

38. The method of any one of the preceding embodiments, wherein the device comprises a second device associated with a second user, wherein generating the status indication at the second device comprises: generating the status indication at the second device to indicate that a first device associated with a first user is involved in executing the one or more portions of the first software programming workflow.

39. The method of any one of the preceding embodiments, wherein generating the status indication comprises: providing a hypertext link to the second device to cause the second device to execute one or more operations to configure a web browser to navigate to a code repository.

40. The method of any one of the preceding embodiments, further comprising: triggering a script at a webhook endpoint, the script configured to execute a command to update a local codebase of the second device based on one or more changes at a remote repository.

41. The method of any one of the preceding embodiments, wherein the device comprises a first device associated with a first user, wherein generating the status indication at the first device comprises: generating the status indication at the first device to indicate that a second device associated with a second user is involved in executing the second event involved in the one or more portions of the first software programming workflow.

42. The method of any one of the preceding embodiments, further comprising: determining that the second device does not have access to code associated with the first event; and providing, at the first device, an indication of a request for access to the code associated with the first event.

43. The method of any one of the preceding embodiments, wherein providing the indication of the request comprises: providing a hyperlink text to cause the first device to execute one or more operations to configure a web browser to navigate to a code repository and update access permissions to the code associated with the first event.

44. A tangible, non-transitory, machine-readable medium storing instructions that, when executed by a data processing apparatus, cause the data processing apparatus to perform operations comprising those of any of embodiments 1-43.

45. A system comprising one or more processors; and memory storing instructions that, when executed by the processors, cause the processors to effectuate operations comprising those of any of embodiments 1-39.

46. A system comprising means for performing any of embodiments 1-43.

What is claimed is:

1. A system for reducing computing processing and memory consumption by consolidating duplicate operations across software and/or feature programming workflows by providing status indications in response to detection of one or more duplicate operations between a first software programming workflow and a second software programming workflow, the system comprising:
    one or more processors; and
    a non-transitory, computer readable medium comprising instructions that when executed by the one or more processors cause operations comprising:
        receive, via a first device associated with a first user, a de-duplication request;
        in response to receiving the de-duplication request, obtain, the first software programming workflow comprising a first set of events and the second software programming workflow comprising a second set of events;
        determine the first set of events for the first software programming workflow and the second set of events for the second software programming workflow;
        determine that a first event of the first software programming workflow corresponds to a second event of the second software programming workflow based on one or more portions of the first software programming workflow and the second software programming workflow overlapping;
        in response to determining that the first event corresponds to the second event, determine a first state associated with the first event and a second state associated with the second event, the first state indicating that the first event is completed and the second state indicating that the second event is not completed;
        cause a second device that is associated with a second user and involved in executing the second event associated with a user assigned to complete the second event to generate a status indication of one or more aspects of the first event that are common to the second event based on the first state or the second state satisfying a completion threshold, wherein the status indication includes an executable command to update a local codebase of the second device based on one or more changes at a remote repository;
        determining that the second device does not have access to code associated with the first event; and
        providing, at the first device, an indication of a request for the access to the code associated with the first event.

2. A method for reducing computing processing and memory consumption by consolidating duplicate operations across software and/or feature programming workflows by providing status indications in response to detection of one or more duplicate operations between software programming workflows, comprising:
    receiving, via a first device associated with a first user, a de-duplication request;
    in response to receiving the de-duplication request, obtaining a first software programming workflow comprising a first plurality of events and a second software programming workflow comprising a second plurality of events;
    determining a first set of events for the first software programming workflow and a second set of events for the second software programming workflow;
    determining that a first event of the first software programming workflow corresponds to a second event of the second software programming workflow based on one or more portions of the first software programming workflow and the second software programming workflow overlapping;
    in response to determining that the first event corresponds to the second event, determining a first state associated with the first event and a second state associated with the second event;
    causing a second device that is associated with a second user and involved in executing the second event to generate a status indication of one or more aspects of the first event or the second event based on the first state or the second state satisfying a completion threshold, wherein the status indication includes an executable command to update a local codebase of the second device based on one or more changes at a remote repository;
    determining that the second device does not have access to code associated with the first event; and
    providing, at the first device, an indication of a request for the access to the code associated with the first event.

3. The method of claim 2, further comprising:
    obtaining a first specification for a first feature programming workflow and a second specification for a second feature programming workflow,
    wherein determining the first set of events and the second set of events comprises:
        determining the first set of events based on the first specification, and the second set of events based on the second specification.

4. The method of claim 3, wherein determining the first set of events and the second set of events comprises:
    extracting the first set of events from the first specification and the second set of events from the second specification.

5. The method of claim 4, wherein extracting the first set of events from the first specification and the second set of events from the second specification comprises:
    recursively stepping through the first specification and the second specification to identify the first set of events established by the first specification and the second set of events established by the second specification; and
    determining the first set of events for the first feature programming workflow and the second set of events for the second feature programming workflow based on one or more dependencies involving the first set of events and the second set of events.

6. The method of claim 2, wherein determining that the first event corresponds to the second event comprises:
   determining one or more first aspects of the first event and one or more second aspects the second event;
   comparing the one or more first aspects to the one or more second aspects; and
   in response to determining the one or more first aspects match the one or more second aspects, determining that the first event corresponds to the second event.

7. The method of claim 6, wherein determining the one or more first aspects of the first event and the one or more second aspects the second event comprises:
   determining one or more first modules involving the first software programming workflow are associated with a first set of inputs and outputs, and
   determining one or more second modules involving the second software programming workflow are associated with a second set of inputs and outputs,
   wherein determining the one or more first aspects match the one or more second aspects comprises:
      determining the first set of inputs and outputs matches the second set of inputs and outputs.

8. The method of claim 6, wherein determining the one or more first aspects of the first event and the one or more second aspects the second event comprises:
   determining one or more application programming interfaces (APIs) of the first software programming workflow and one or more APIs of the second software programming workflow,
   wherein determining the one or more first aspects match the one or more second aspects comprises:
      determining the one or more APIs of the first software programming workflow matches the one or more APIs of the second software programming workflow.

9. The method of claim 2, further comprising:
   determining the one or more portions of the first software programming workflow and the second software programming workflow,
   wherein causing the-second device to generate the status indication of the one or more aspects of the first event or the second event based on the first state or the second state satisfying the completion threshold comprises:
      causing the second device to generate the status indication at a device involved in executing the one or more portions of the first software programming workflow or the second software programming workflow to indicate the one or more portions of the first software programming workflow and the second software programming workflow that overlap.

10. The method of claim 9, wherein the second device associated with the second user,
    wherein generating the status indication at the second device comprises:
       generating the status indication at the second device to indicate that the first device associated with the first user is involved in executing the one or more portions of the first software programming workflow.

11. The method of claim 10, wherein generating the status indication comprises:
    providing a hypertext link to the second device to cause the second device to execute one or more operations to configure a web browser to navigate to a code repository.

12. The method of claim 10, further comprising:
    triggering a script at a webhook endpoint.

13. The method of claim 9, wherein the device comprises the first device associated with the first user,
    wherein generating the status indication at the first device comprises:
       generating the status indication at the first device to indicate that the second device associated with the second user is involved in executing the second event involved in the one or more portions of the first software programming workflow.

14. The method of claim 2, wherein providing the indication of the request comprises:
    providing a hyperlink text to cause the first device to execute one or more operations to configure a web browser to navigate to a code repository and update access permissions to the code associated with the first event.

15. One or more non-transitory, computer readable mediums comprising instructions that when executed by one or more processors cause operations comprising:
    receiving, via a first device associated with a first user, a de-duplication request;
    in response to receiving the de-duplication request, obtaining a first software programming workflow comprising a first plurality of events and a second software programming workflow comprising a second plurality of events;
    determining a first set of events for the first software programming workflow and a second set of events for the second software programming workflow;
    determining that a first event of the first software programming workflow corresponds to a second event of the second software programming workflow based on one or more portions of the first software programming workflow and the second software programming workflow overlapping;
    in response to determining that the first event corresponds to the second event, determining a first state of the first event and a second state of the second event;
    causing a second device that is associated with a second user and involved in executing the second event to generate a status indication of one or more aspects of the first event or the second event based on the first state or the second state satisfying a completion threshold, wherein the status indication includes an executable command to update a local codebase of the second device based on one or more changes at a remote repository;
    determining that the second device does not have access to code associated with the first event; and
    providing, at the first device, an indication of a request for the access to the code associated with the first event.

16. The one or more non-transitory, computer readable mediums of claim 15, further comprising:
    obtaining a first specification for a first feature programming workflow and a second specification for a second feature programming workflow,
    wherein determining the first set of events and the second set of events comprises:
       determining the first set of events based on the first specification, and the second set of events based on the second specification.

17. The one or more non-transitory, computer readable mediums of claim 16, wherein determining the first set of events and the second set of events comprises:
    extracting the first set of events from the first specification and the second set of events from the second specification.

18. The one or more non-transitory, computer readable mediums of claim 17, wherein extracting the first set of events from the first specification and the second set of events from the second specification comprises:
- recursively stepping through the first specification and the second specification to identify the first set of events established by the first specification and the second set of events established by the second specification; and
- determining the first set of events for the first feature programming workflow and the second set of events for the second feature programming workflow based on one or more dependencies involving the first set of events and the second set of events.

19. The one or more non-transitory, computer readable mediums of claim 15, wherein determining that the first event corresponds to the second event comprises:
- determining one or more first aspects of the first event and one or more second aspects the second event;
- comparing the one or more first aspects to the one or more second aspects; and
- in response to determining the one or more first aspects match the one or more second aspects, determining that the first event corresponds to the second event.

\* \* \* \* \*